United States Patent
Dixon et al.

(10) Patent No.: US 11,106,026 B2
(45) Date of Patent: Aug. 31, 2021

(54) SCANNING MICROSCOPE FOR 3D IMAGING USING MSIA

(71) Applicants: A. E. Dixon, Waterloo (CA); Savvas Damaskinos, Waterloo (CA); Alfonso Ribes, Waterloo (CA); Jasper Hayes, Waterloo (CA)

(72) Inventors: A. E. Dixon, Waterloo (CA); Savvas Damaskinos, Waterloo (CA); Alfonso Ribes, Waterloo (CA); Jasper Hayes, Waterloo (CA)

(73) Assignee: HURON TECHNOLOGIES INTERNATIONAL INC., St. Jacobs (CA)

( * ) Notice: Subject to any disclaimer, the term of this patent is extended or adjusted under 35 U.S.C. 154(b) by 16 days.

(21) Appl. No.: 15/961,390

(22) Filed: Apr. 24, 2018

(65) Prior Publication Data
US 2018/0307019 A1 Oct. 25, 2018

Related U.S. Application Data

(60) Provisional application No. 62/489,230, filed on Apr. 24, 2017.

(51) Int. Cl.
*H04N 7/18* (2006.01)
*G02B 21/00* (2006.01)
(Continued)

(52) U.S. Cl.
CPC ....... *G02B 21/0036* (2013.01); *G02B 21/006* (2013.01); *G02B 21/0052* (2013.01);
(Continued)

(58) Field of Classification Search
CPC ...... G02B 21/16; G02B 21/367; G02B 21/26; G02B 21/361; G02B 21/365; G02B 21/12;
(Continued)

(56) References Cited

U.S. PATENT DOCUMENTS 6,055,097 A 4/2000 Lanni et al.
6,072,624 A 6/2000 Dixon et al.
(Continued)

FOREIGN PATENT DOCUMENTS

CA 2837226 A1 11/2012
CA 2981348 A1 6/2016

OTHER PUBLICATIONS

Peter J. Shaw et al., Tilted view reconstruction in optical microscopy, Jan. 1989, vol. 55 pp. 101-110.*

*Primary Examiner* — Gims S Philippe
(74) *Attorney, Agent, or Firm* — Bereskin & Parr LLP/S.E.N.C.R.L., s.r.l.

(57) ABSTRACT

According to some examples, an instrument for scanning a specimen on a specimen holder. The instrument includes a scanning stage for supporting the specimen, and a detector having a plurality of pixels. The scanning stage and the detector are movable relative to each other to move the specimen in a scan direction during a scan. At least some of the pixels of the detector are operable to collect light from different depths inside the specimen during the scan and generate corresponding image data. The instrument also includes a processor operable to perform MSIA on the image data to generate a 3D image of the specimen.

15 Claims, 23 Drawing Sheets

(51) Int. Cl.
*G02B 21/36* (2006.01)
*G02B 21/26* (2006.01)

(52) U.S. Cl.
CPC ........... *G02B 21/26* (2013.01); *G02B 21/361* (2013.01); *G02B 21/365* (2013.01)

(58) Field of Classification Search
CPC ...... G02B 5/201; G02B 21/006; G02B 21/36; G02B 21/0036; G02B 21/0076; G02B 21/0044
USPC .......................................................... 348/79
See application file for complete search history.

(56) References Cited

U.S. PATENT DOCUMENTS

| | | | |
|---|---|---|---|
| 6,078,681 A | 6/2000 | Silver | |
| 2009/0295963 A1* | 12/2009 | Bamford | G02B 21/34 348/302 |
| 2013/0342674 A1* | 12/2013 | Dixon | G02B 21/36 348/79 |
| 2014/0231638 A1* | 8/2014 | Damaskinos | B82Y 35/00 250/234 |
| 2015/0054921 A1* | 2/2015 | Dixon | G02B 21/26 348/46 |
| 2019/0018231 A1* | 1/2019 | Dixon | G02B 21/002 |

* cited by examiner

SCANNING MICROSCOPE FOR 3D IMAGING USING MSIA

TECHNICAL FIELD

Embodiments herein relate to the fields of scanning microscope imaging of large specimens, with particular emphasis on 3D brightfield imaging, as well as fluorescence and spectrally-resolved imaging. Applications may include imaging tissue specimens and other pathology slides, genetic microarrays, protein arrays, tissue arrays, cells and cell populations, biochips, arrays of biomolecules, fluorescent nanoparticles, semiconductor materials and devices, and many others.

INTRODUCTION

Several technologies are used for 2D imaging of large specimens at high resolution. With tiling microscopes, the image of a small area of the specimen is recorded with a digital camera (usually a CCD or CMOS camera), the specimen is moved with a computer-controlled microscope stage to image an adjacent area, an image of the adjacent area is recorded, the stage is moved again to the next area, and so on until a number of image tiles have been recorded that together cover the whole area of the specimen. Images of each area (image tiles) are recorded when the stage is stationary, after waiting long enough for vibrations from the moving stage to dissipate, and using an exposure time that is sufficient to record the fluorescence images. These image tiles can be butted together, or overlapped and stitched using computer stitching algorithms, to form one image of the entire specimen When tiling microscopes are used for fluorescence imaging, the areas surrounding each tile and the overlapping edges of adjacent tiles are exposed twice (and the corners four times), which can bleach some fluorophores. Exposure is typically adjusted by changing the exposure time for each tile. If multiple fluorophores are imaged, a different exposure time is required for each, so each fluorophore requires a separate image at each tile position. Multiple exposure of the specimen for imaging multiple fluorophores can also increase bleaching. After all tiles have been collected, considerable effort (both human and computer) is required to stitch the tiles together and correct each tile for illumination intensity and collection sensitivity changes across the field of view of the microscope (correction for variations in illumination intensity and collection sensitivity is sometimes called "field flattening"). Stitching tiles together is also complicated by distortion and curvature of field of the microscope objective, which occur near the edges of the field of view (just where stitching of tiles occurs).

Some strip scanning instruments are also used for imaging large specimens. In these instruments, infinity-corrected microscope optics are used, with a high Numerical Aperture (high NA) microscope objective and a tube lens of the appropriate focal length to focus an image of the specimen directly on a CCD or CMOS linear array sensor, or TDI sensor, with the correct magnification to match the resolution of the microscope objective with the detector pixel size for maximum magnification in the digitized image {as described in "Choosing Objective Lenses: The Importance of Numerical Aperture and Magnification in Digital Optical Microscopy", David W. Piston, Biol. Bull. 195, 1-4 (1998)}. A linear CCD detector array with 1000 or 2000 pixels is often used, and three separate linear detectors with appropriate filters to pass red, green and blue light are used for RGB brightfield imaging. The sample is moved at constant speed in the direction perpendicular to the long dimension of the linear detector array to scan a narrow strip across a microscope slide. The entire slide can be imaged by imaging repeated strips and butting them together to create the final image. Another version of this technology uses TDI (Time Delay and Integration) array sensors which increase both sensitivity and imaging speed. In both of these instruments, exposure is varied by changing illumination intensity and/or scan speed.

An example of such a microscope is shown in FIG. 1. A tissue specimen 100 (or other specimen to be imaged) mounted on microscope slide 101 is illuminated from below by illumination source 110. In some cases, the tissue specimen 100 may be a biological specimen, which is commonly covered with a transparent cover slip (not shown). Light passing through the specimen is collected by infinity-corrected microscope objective 115 which is focused on the specimen by piezo positioner 120. The microscope objective 115 and tube lens 125 form a real image of the specimen on linear detector array 130. An image of the specimen is collected by moving the microscope slide at constant speed using motorized stage 105 in a direction perpendicular to the long dimension of the detector array 130, combining a sequence of equally-spaced line images from the array to construct an image of one strip across the specimen. Strips are then assembled to form a complete image of the specimen.

For brightfield imaging, most strip-scanning instruments illuminate the specimen from below, and detect the image in transmission using a sensor placed above the specimen. In brightfield, signal strength is high, and red, green and blue channels are often detected simultaneously with separate linear detector arrays to produce a colour image.

Compared to brightfield imaging, fluorescence signals can be thousands of times weaker, and in particular some fluorophores have much weaker emission than others. Fluorescence microscopy is usually performed using illumination from the same side as detection (epifluorescence) so that the bright illumination light passing through the specimen does not enter the detector. In strip-scanning instruments, exposure is varied by changing scan speed, so present strip-scanning instruments scan each fluorophore separately, reducing the scan speed when greater exposure is required for a weak fluorophore. Since exposure is adjusted by changing scan speed, it is difficult to design a strip-scanner for simultaneous imaging of multiple fluorophores, where each channel would have the same exposure time, and existing strip-scanners scan one fluorophore at-a-time. In addition, in fluorescence microscopy, relative intensity measurements are sometimes important for quantitative measurement, and 12 or 16 bit dynamic range may be required. For existing strip scanners, this would require larger dynamic range detectors and slower scan speeds.

Before scanning a large specimen in fluorescence, it is normally important to set the exposure time (in a tiling or strip-scanning microscope) or the combination of laser intensity, detector gain and scan speed (in a scanning laser macroscope or microscope) so that the final image will be properly exposed—in general it should not contain saturated pixels, but the gain should be high enough that the full dynamic range will be used for detecting each fluorophore in the final image. Two problems must be solved to achieve this result—the exposure must be estimated in advance for each fluorophore, and for simultaneous detection of multiple fluorophores the exposure time must be estimated and scan speed set before scanning.

For strip-scanning instruments, estimating the exposure in advance is difficult without scanning the whole specimen first to check exposure, and this must be done for each fluorophore. Instead of scanning first to set exposure, many operators simply set the scan speed to underexpose slightly, with resulting noisy images, or possibly images with some overexposed (saturated) areas if the estimated exposure was not correct. For macroscope-based instruments, a high-speed preview scan can be used to set detection gain in each channel before final simultaneous imaging of multiple fluorophores (see WO2009/137935 A1, "Imaging System with Dynamic Range Maximization").

An example of a scanning microscope for fluorescence imaging is shown in FIG. 2. A tissue specimen 100 (or other specimen to be imaged) mounted on microscope slide 101 is illuminated from above by illumination source 200. In fluorescence imaging, the illumination source is usually mounted above the specimen (epifluorescence) so that the intense illumination light that passes through the specimen is not mixed with the weaker fluorescence emission from the specimen, as it would be if the illumination source were below the specimen.

Several different optical combinations can be used for epifluorescence illumination—including illumination light that is injected into the microscope tube between the microscope objective and the tube lens, using a dichroic beamsplitter to reflect it down through the microscope objective and onto the specimen. In addition, a narrow wavelength band for the illumination light is typically chosen to match the absorption peak of the fluorophore in use. Fluorescence emitted by the specimen is collected by infinity-corrected microscope objective 115, which is focused on the specimen by piezo positioner 120.

Emission filter 205 is chosen to reject light at the illumination wavelength and to pass the emission band of the fluorophore in use. The microscope objective 115 and tube lens 125 form a real image of the specimen on TDI detector array 210.

An image of the specimen is collected by moving the microscope slide using motorized stage 105 in a direction perpendicular to the long dimension of the detector array 210, combining a sequence of equally-spaced, time-integrated line images from the array to construct an image of one strip across the specimen. Strips are then assembled to form a complete image of the specimen.

When a CCD-based TDI array is used, each line image stored in memory is the result of integrating the charge generated in all of the previous lines of the array while the scan proceeds, and thus has both increased signal/noise and amplitude (due to increased exposure time) when compared to the result from a linear array detector. Exposure is also increased by reducing scan speed, so the scan time (and thus image acquisition time) is increased when using weak fluorophores. It is difficult to predict the best exposure time before scanning. When multiple fluorophores are used on the same specimen, the usual imaging method is to choose illumination wavelengths to match one fluorophore, select the appropriate emission filter and scan time (speed) for the chosen fluorophore, and scan one strip in the image. Then the illumination wavelength band is adjusted to match the absorption band of the second fluorophore, a matching emission filter and scan speed are chosen, and that strip is scanned again. Additional fluorophores require the same steps to be repeated. Finally, this is repeated for all strips in the final image.

Some instruments use multiple TDI detector arrays to expose and scan multiple fluorophores simultaneously, but this usually results in a final image where one fluorophore is exposed correctly and the others are either under- or overexposed. Exposure can be adjusted by changing the relative intensity of the excitation illumination for each fluorophore, which should be easy to do if LED illumination is used. When multiple illumination bands are used at the same time, the resulting image for each fluorophore may differ from that produced when only one illumination band is used at a time because of overlap of the multiple fluorophore excitation and emission bands, and because autofluorescence from the tissue itself may be excited by one of the illumination bands. Autofluorescence emission usually covers a wide spectrum and may cause a bright background in all of the images when multiple fluorophores are illuminated and imaged simultaneously.

A description of strip scanning instruments, using either linear arrays or TDI arrays, is given in US Patent Application Publication #US2009/0141126 A1 ("Fully Automatic Rapid Microscope Slide Scanner", by Dirk Soenksen).

Linear arrays work well for brightfield imaging, but the user is often required to perform a focus measurement at several places on the specimen before scanning, or a separate detector is used for automatic focus. Linear arrays are not often used for fluorescence imaging because exposure time is inversely proportional to scan speed, which makes the scan time very long for weak fluorophores. In addition, exposure (scan speed) must be adjusted for each fluorophore, making simultaneous measurement of multiple fluorophores difficult when they have widely different fluorescence intensity (which is common).

TDI arrays and associated electronics are expensive, but the on-chip integration of several exposures of the same line on the specimen provides the increased exposure time required for fluorescence imaging while maintaining a reasonable scan speed. Simultaneous imaging of multiple fluorophores using multiple TDI detector arrays is still very difficult however, since each of the detectors has the same integration time (set by the scan speed), so it is common to use only one TDI array, adjusting exposure for each fluorophore by changing the scan speed and collecting a separate image for each fluorophore. Focus is set before scanning at several positions on the specimen, or automatic focus is achieved using a separate detector or focus measuring device.

These scanners require dynamic focus while scanning, with focus adjustment directed by pre-scan focus measurements at several positions along each image strip, or by using a separate focus detector.

Definitions

For the purposes of this document, a "macroscopic specimen" (or "large microscope specimen") is generally defined as one that is larger than the field of view of a compound optical microscope, such as a compound optical microscope containing a microscope objective that has the same Numerical Aperture (NA) as that of the scanner described in this document.

For the purposes of this document, "TDI" or "Time Delay and Integration" is generally defined as a method and detectors used for scanning moving objects, usually including a CCD-based detector array in which charge is transferred from one row of pixels in the detector array to the next in synchronism with the motion of the real image of the moving object. As the object (and its image) moves, charge builds up and the result is charge integration just as if a longer exposure were used in a stationary imaging situation.

When the image (and integrated charge) reaches the last row of the array, that line of pixels is read out. One example of such a camera is the DALSA Piranha TDI camera. CMOS TDI imagers have also been developed. CCD TDI imagers combine signal charges, while CMOS TDI imagers combine voltage signals.

For the purposes of this document the term "image acquisition" generally includes the steps necessary to acquire and produce a final image of the specimen, which may include some of, but is not necessarily limited to, the following: the steps of preview scanning, instrument focus, predicting and setting gain for imaging each fluorophore, image adjustments including demosaicing (where required), scan linearity adjustment, field flattening (compensating for fluorescence intensity variation caused by excitation intensity and detection sensitivity changes across the field of view), dark frame subtraction, correction of frame images for geometric distortion, correction of fluorescence signal in one channel caused by overlap of fluorescence from adjacent (in wavelength) channels when two or more fluorophores are excited simultaneously, dynamic range adjustment, butting or stitching together adjacent image strips (when necessary), storing, transmitting, assembling and viewing the final image.

For the purposes of this document, a "frame grabber" generally includes any electronic device that captures individual, digital still frames from an analog video signal or a digital video stream or digital camera. It is often employed as a component of a computer vision system, in which video frames are captured in digital form and then displayed, stored or transmitted in raw or compressed digital form. This definition may include direct camera connections via USB, Ethernet, IEEE 1394 ("FireWire") and other interfaces that are now practical.

Moving Specimen Image Averaging ("MSIA") is generally defined as the method and technology for acquiring digital strip images (i.e., image strips) across a large microscope specimen or other specimen by capturing sequential overlapping frame images of a moving specimen, typically where a new image frame is captured each time the specimen has moved a distance that causes the image of that specimen projected by the optics onto a two-dimensional detector array to move a distance equal to the distance between a small number of rows of detectors in the detector array (where this number is normally held constant while scanning digital image strips, and is usually equal to 1), image data from the new frame is translated (moved) in computer memory to match the motion of the optical image across the detector array, and is added to (or in some cases may be averaged with) the data previously stored to generate an image of a strip across the specimen. In some cases, such a procedure may be continued until the specimen has moved a distance such that all object points in that strip have been exposed a number of times equal to the number of active rows in the detector array (usually chosen by defining a "detector area of interest" or "detector active area" that has the width of the detector but a smaller number of rows than the detector array contains) divided by the smaller number of rows moved between each successive image capture. All pixels in the image strip that results tend to have increased signal-to-noise ratio (S/N) because of pixel averaging, where the increased signal-to-noise ratio is equal to the square root of the number of times each pixel has been averaged to produce the final MSIA strip image, and increased dynamic range because of pixel addition and the reduction of noise caused by averaging (especially in the dark pixels).

As used herein, the terms "frame image" and "image frame" are identical to one another and are used interchangeably.

"Fluorescence" generally includes fluorescence from naturally-occurring sources inside the specimen and fluorescent dyes and markers (including for example quantum dots) that may be added to the specimen, as well as fluorescence from the substrate or a layer above the specimen.

"Spectral imaging" generally refers to the method and technology for acquiring images in which each pixel is represented by its spectrum.

"Hyperspectral imaging" generally refers to the method and technology for acquiring images in which each pixel is represented by a spectrum composed of narrow spectral bands over a continuous spectral range.

"Imaging spectroscopy" generally refers to the acquisition and processing of hyperspectral images.

"Multispectral imaging" generally refers to the method and technology for acquiring multiple images of an object, each image representing a range of wavelengths. For example, each image could represent the emission range (or part of the emission range) of a particular fluorophore. In this case each pixel in the final multispectral image may not contain a spectrum of the fluorescence emitted by the specimen at that position, but contains information about the signal detected from each fluorophore at that pixel position.

For the purposes of this document, a "mosaic scan filter array" is generally defined as a mosaic filter array that is designed for high resolution imaging using MSIA scanning, typically where the resulting image contains full colour information at each pixel position and typically without requiring demosaicing or interpolation.

A "scan colour filter array" is generally defined as a colour filter array comprised of rows of different colour filters, where each row contains a single colour, that has been designed for MSIA scanning such that when used in MSIA scanning every pixel position in the final image may contain full colour information, typically with no interpolation required.

For the purposes of this document, a "3D image of a large microscope specimen" is generally defined as a scanned image of the specimen containing two or more image planes which may be separated in the vertical direction by a distance equal to or greater than half the depth of field of the microscope objective lens in use.

The "scan plane" is generally defined as a plane in which the specimen moves during scanning. When the specimen is mounted on a microscope slide, the scan plane is typically parallel to the surface of the microscope slide.

SUMMARY OF VARIOUS EMBODIMENTS

One or more embodiments as described herein may provide a scanning instrument and method of imaging whereby MSIA scanning is used to produce a 3D image of a large microscope specimen where the 3D image includes a number of image planes where the S/N of each image plane in the 3D image is greater than that produced without using MSIA imaging.

One or more embodiments as described herein may provide a scanning instrument and method of imaging whereby MSIA scanning is used to produce a 2D image of a large microscope specimen with improved S/N and a greater depth of field than that produced by a scanner not using MSIA scanning.

One or more embodiments as described herein may provide a scanning instrument and method of imaging whereby MSIA scanning is used to produce a 3D image of a large microscope specimen with improved S/N, where each image plane in the 3D image also has a depth of field that is greater than that of image planes in a 3D image produced without MSIA scanning.

One or more embodiments as described herein may provide a scanning instrument and method of imaging whereby MSIA scanning is used to produce a 3D brightfield image of a large microscope specimen with improved S/N.

One or more embodiments as described herein may provide a scanning microscope and method of imaging whereby MSIA scanning is used to produce a 3d fluorescence image of a large microscope specimen with improved S/N.

One or more embodiments as described herein may provide a method of scanning a large microscope specimen on a glass microscope slide (or other specimen holder) using a two-dimensional detector array that is tilted in the scan direction (the usual orientation for such a detector array is perpendicular to the optical axis of the instrument and parallel to the microscope slide) such that a series of image frames tilted with respect to the surface of microscope slide are acquired as the stage scans, where data from each active area (comprised of adjacent rows of pixels) of the detector may be averaged using MSIA (or in some embodiments added) to produce one plane of a three-dimensional image of the specimen, which may include the entire thickness of the specimen in the case of thin specimens. Optical tilt of the detector with respect to the lens can also be achieved by putting a glass (or other optical material) wedge in front of the detector.

One or more embodiments as described herein may provide a microscope slide scanner and method for acquiring a stack of image planes using a two-dimensional detector array tilted in the scan direction and MSIA, such image stack being used with computer-based deconvolution of the scanner's point spread function to provide increased resolution.

One or more embodiments as described herein may provide a microscope slide scanner and method for acquiring a stack of image planes using a two-dimensional detector array tilted in the scan direction (or in another direction) and MSIA imaging such that each active area of rows in the array images a different plane in the specimen, resulting in a three-dimensional image comprised of a stack of image planes, and software that enables the user to change the focus plane being viewed by moving up and down in the image stack.

One or more embodiments as described herein may provide a microscope slide scanner and method for acquiring a stack of image planes using a two-dimensional detector array tilted in the scan direction and MSIA such that each active area of rows in the array images a different plane in the specimen, resulting in a three-dimensional image comprised of a stack of image planes, and software that enables the user to apply pattern-recognition algorithms to the three-dimensional image stack to identify regions of interest and for use in computer-aided diagnosis.

One or more embodiments as described herein may provide a microscope slide scanner and method for acquiring a stack of image planes using a two-dimensional detector array tilted in the scan direction and MSIA such that each active area of rows in the array images a different area in the tilted object plane in the specimen, resulting in a three-dimensional image that includes a stack of image planes, and software (or other arrangements) that corrects each image frame acquired by the two-dimensional detector array for geometric distortion before averaging in the MSIA process.

One or more embodiments as described herein may provide a microscope slide scanner and method for acquiring a stack of image planes using a two-dimensional detector array tilted in the scan direction in which the entire area of the detector array (or at least a substantial portion of the detector array) is active and adjacent rows of pixel data in each image frame are chosen by software before MSIA such that these adjacent rows of data act like active areas of rows of the detector array in the MSIA calculation for each different plane in the 3D image of the specimen, resulting in a three-dimensional image that includes a stack of image planes.

One or more embodiments as described herein may provide a microscope slide scanner and method for acquiring a stack of image planes using a two-dimensional detector array tilted in the scan direction in which the entire area of the detector array is active and adjacent rows of pixel data in each image frame are chosen by software before MSIA such that these adjacent rows of data act like active areas of rows in the MSIA calculation for each different plane in the 3D image of the specimen, resulting in a three-dimensional image that includes a stack of image planes, and software that corrects each image frame acquired by the two-dimensional detector array for geometric distortion before adjacent rows of data are chosen for the MSIA calculation.

One or more embodiments as described herein may provide a microscope slide scanner and method for acquiring a stack of image planes using a two-dimensional detector array tilted in the scan direction in which the entire area of the detector array (or at least a substantial portion of the detector array) is active and areas of pixel data in each image frame are chosen by software before MSIA, such that these areas of pixel data act like active areas of rows of the detector array in the MSIA calculation for each different plane in the 3D image of the specimen, resulting in a three-dimensional image that includes a stack of image surfaces with the same shape as the surface of the specimen, or in some cases of a reference surface.

One or more embodiments as described herein may provide a microscope slide scanner and method for acquiring a stack of image surfaces (or a single image surface) using a two-dimensional detector array tilted in the scan direction relative to an axis perpendicular to the scan direction and to the optical axis of the scanner in which the entire area of the detector array is active and adjacent rows of pixel data in each image frame are chosen by software before MSIA such that these adjacent rows of data act like active areas of rows in the MSIA calculation for each different surface in the 3D image of the specimen, resulting in a three-dimensional image that includes a stack of image surfaces, and software that adjusts the position and shape of the active areas on the detector array defined by software during scan to enable the image surfaces to maintain a constant distance relative to a reference position in the frame image where such reference position may be an image of the top of the cover slip, the bottom of the cover slip, the top surface of the specimen, or a distance relative to a previously measured or calculated focus map.

One or more embodiments as described herein may provide a microscope slide scanner and method for acquiring a stack of image planes using a scanning stage tilted in the scan direction in which the entire area of the detector array (or at least a substantial portion of the detector array) is active and adjacent rows of pixel data in each image frame are chosen by software before MSIA such that these adjacent rows of data act like active areas of rows of the detector array in the MSIA calculation for each different plane in the 3D image of the specimen, resulting in a three-dimensional image that includes a stack of image planes.

One or more embodiments as described herein may provide a microscope slide scanner and method for acquiring a stack of image planes using a scanning stage tilted in the scan direction in which the entire area of the detector array (or at least a substantial portion of the detector array) is active and adjacent areas of pixel data in each image frame are chosen by software before MSIA such that these adjacent areas of data act like active areas of the detector array in the MSIA calculation for each different surface in the 3D image of the specimen, resulting in a three-dimensional image that includes a stack of image surfaces with the same shape as the surface of the specimen (or other reference surface).

One or more embodiments as described herein may provide a microscope slide scanner and method for acquiring a stack of image planes using a scanning stage tilted in the scan direction in which the entire area of the detector array (or at least a substantial portion of the detector array) is active and where the image of a reference surface in each image frame is used to automatically change focus to follow the shape of the surface of the specimen (or other reference surface or focus map).

One or more embodiments as described herein may be directed to an instrument for scanning a large specimen, the instrument comprising a specimen holder to support the specimen, an optical system to focus an image of a series of parallel object planes in the specimen onto a two dimensional detector array, the detector array having a detector image plane, the detector image plane being tilted relative to the series of object planes in a first direction (i.e., a scan direction) to enable a series of image frames of the specimen to be obtained during a scan as the specimen moves relative to an optical axis of the instrument in a scan plane, where data from each active area (comprised of adjacent rows of pixels) in the detector is averaged using MSIA to produce one plane of a three-dimensional image of the specimen, which in some cases may include the entire thickness of the specimen (i.e., in the case of thin specimens).

One or more embodiments as described herein may be directed to a method for scanning a large specimen using an instrument having a specimen holder to support the specimen, an optical system to focus an image from each object plane of the specimen onto a two-dimensional detector array, the detector having a detector image plane, the specimen being movable relative to the optical system, the method comprising optically tilting the detector image plane relative to the scan plane in a first direction (i.e., a scan direction), acquiring an image of a tilted object plane in the specimen, taking a series of image frames of the specimen during the scan, the image frames being tilted relative to a scan plane, moving the specimen relative to an optical axis of the instrument in the scan plane during a scan, averaging data from each active area (including adjacent rows of pixels) in the detector using MSIA to produce one plane of a three-dimensional image using the data from each active area, assembling the image planes to form a three dimensional image of at least part of the specimen.

BRIEF DESCRIPTION OF THE DIAGRAMS

DESCRIPTION OF VARIOUS EMBODIMENTS

An instrument and method for scanning microscope slides using a two-dimensional sensor array that adds image frames acquired every time the microscope slide has moved an incremental distance that results in the acquired frame being displaced an integer times the distance between adjacent rows of pixels in the final image has been described in U.S. Pat. No. 8,896,918, "Pathology Slide Scanner", by A. E. Dixon. The instrument described in that application has advantages like that of a slide scanner that uses a TDI array, but uses inexpensive two-dimensional arrays instead. In addition, since the final image is a sum of a large number of intermediate image frames, it can have a larger dynamic range than that supported by the detector array, and this increased dynamic range enables multiple fluorophores to be imaged simultaneously using separate detector arrays for each fluorophore, with adjustment for the emission strength (i.e., brightness of the image from each fluorophore) after scan is complete. Each line in the final image is the result of adding several exposures of the same line using different lines of pixels in the detector array and then dividing by the number of exposures, or adding the data from each exposure to a data set with a larger dynamic range. For example, one could add 256 images from an 8-bit detector into a 16-bit image store.

Figure 3A:
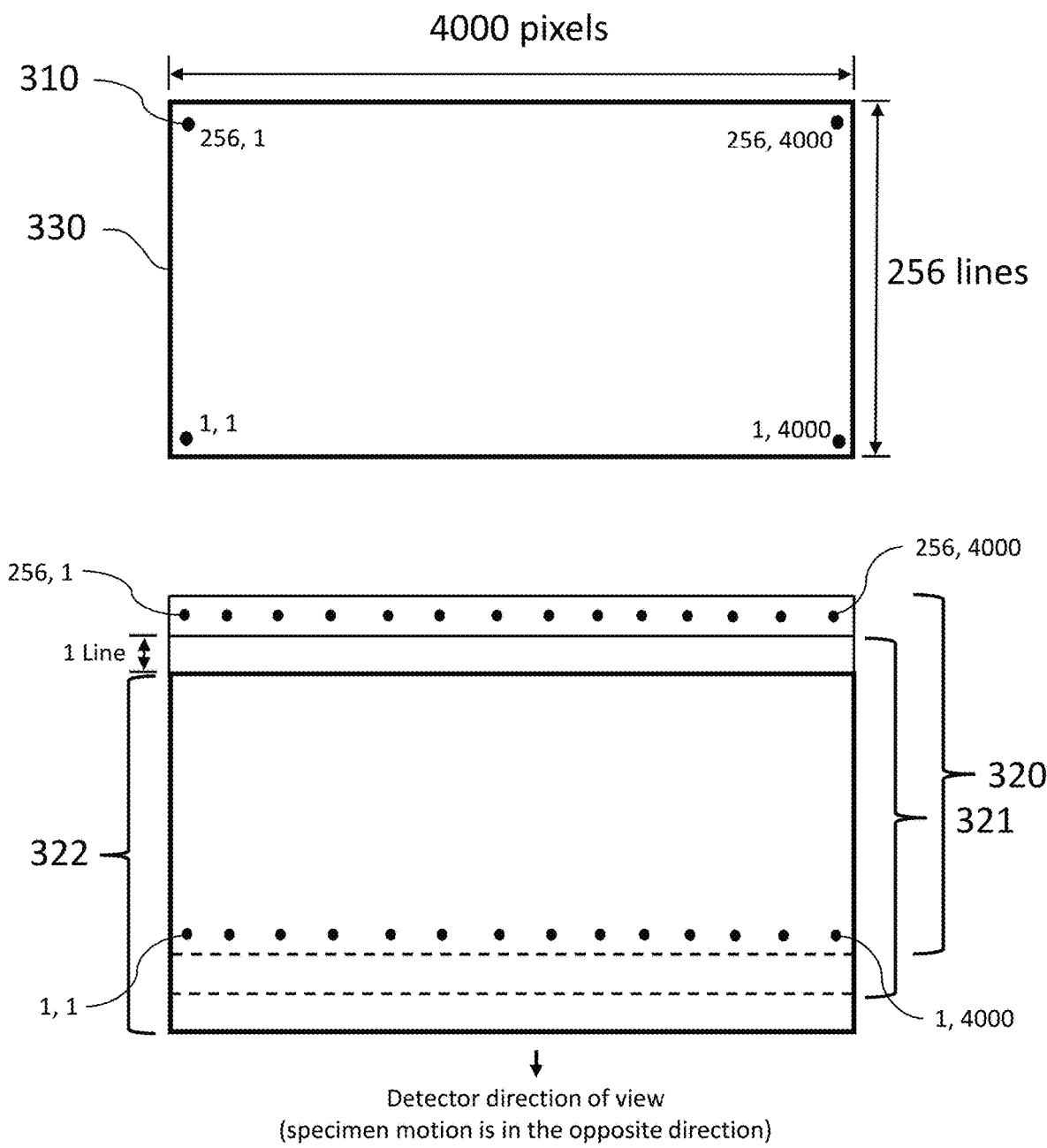
FIG. 3A shows a 256 row by 4000 column detector array in which all rows of the array are active during Moving Specimen Image Averaging.

FIG. 3A shows a 256×4000 pixel detector array (top) and the motion of the field-of-view of the array as the stage moves the specimen during scan (bottom). Using the array shown in FIG. 3A, each pixel in the final strip image stored in the imaging computer is the sum of 256 exposures of the same pixel position in the specimen. In this particular example, if the frame grabber produces 8-bit images, the resulting stored image has a dynamic range of 16 bits (each pixel is made up of a sum of 256 exposures where each exposure has a maximum value of 255). The fluorescence image of the specimen strip being scanned is stored and adjacent strip images are assembled to produce a final image of the entire specimen. Adjacent strips may be assembled by butting them together, or by collecting overlapping strip images and using feature-matching software for registration. This technique is generally called Moving Specimen Image Averaging (MSIA).

Figure 3B:
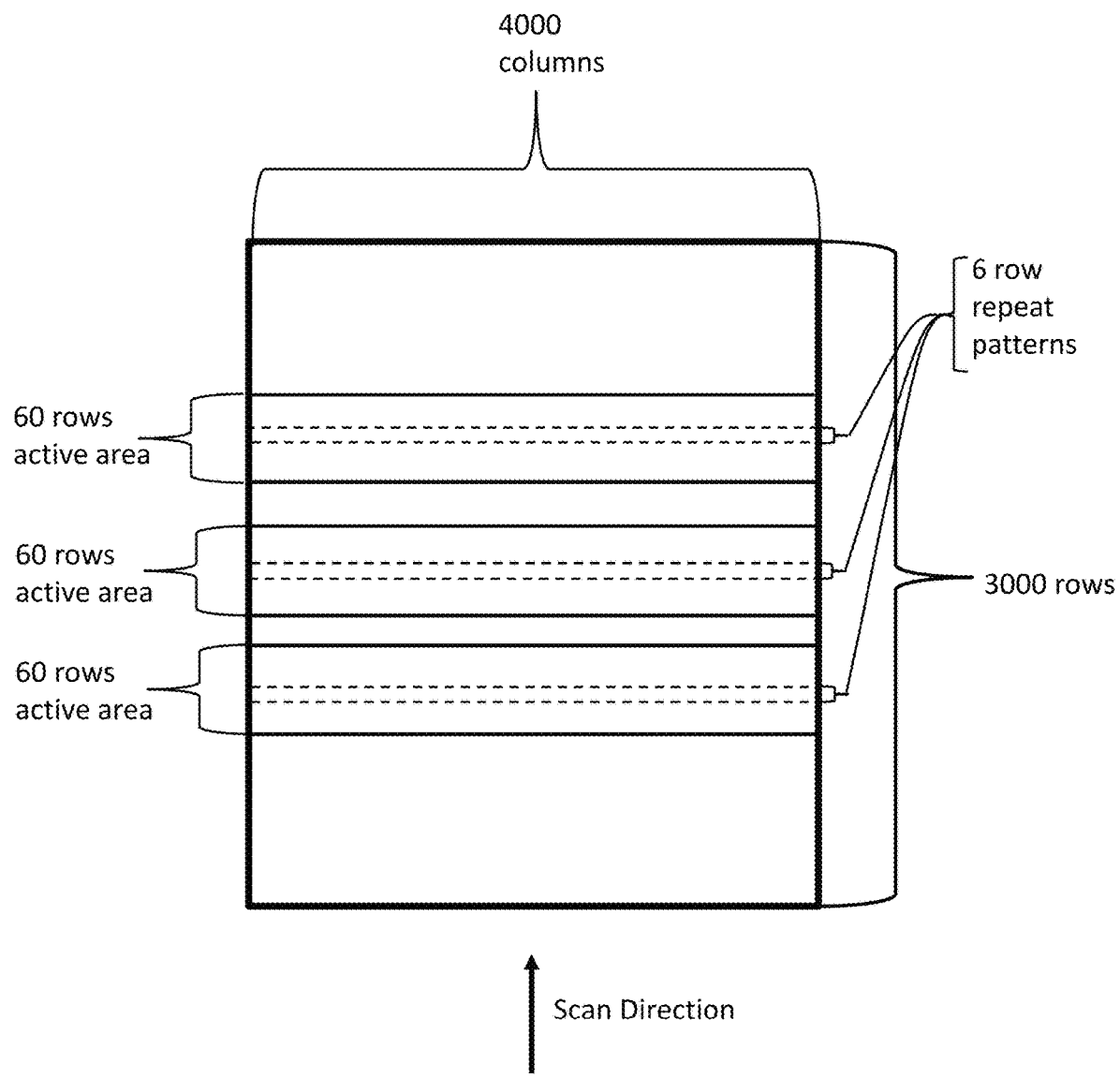
FIG. 3B shows a 3000 row×4000 column detector array with three active areas for MSIA imaging and shows the motion of the field-of-view of the array as the stage moves the specimen during scan.

FIG. 3B is a schematic diagram of a 4000 columns of pixels by 3000 rows of pixels detector array in which light entering each pixel is filtered by a coloured filter placed at the top of the pixel, typically during the manufacture of the detector array. This example of a scan array, which is one of many possibilities, is chosen to illustrate how MSIA can be used for 3D imaging. Three active areas have been chosen that are 60 rows high and 4000 columns wide, and the pattern of coloured filters covering the separate detector pixels is repeated every six rows. When used for MSIA imaging, each of the active areas acts like a separate MSIA detector, with every pixel position in the 6-row repeat pattern being exposed 60/6=10 times, and the S/N of each pixel in the resulting image is increased by the square root of 10 as a result of averaging in the MSIA process. Some detector arrays allow active areas to be chosen and only data from those active areas are read out (which reduces readout time, hence increases the camera's effective maximum frame rate). However it may also be possible to read out data from the entire array and then use only the rows of data required to define active areas, discarding data that is not required in the MSIA calculation. When the entire array is read out, it may even be possible to define overlapping active areas by using data more than once from rows that overlap adjacent active areas in the MSIA calculation.

Figure 4A:
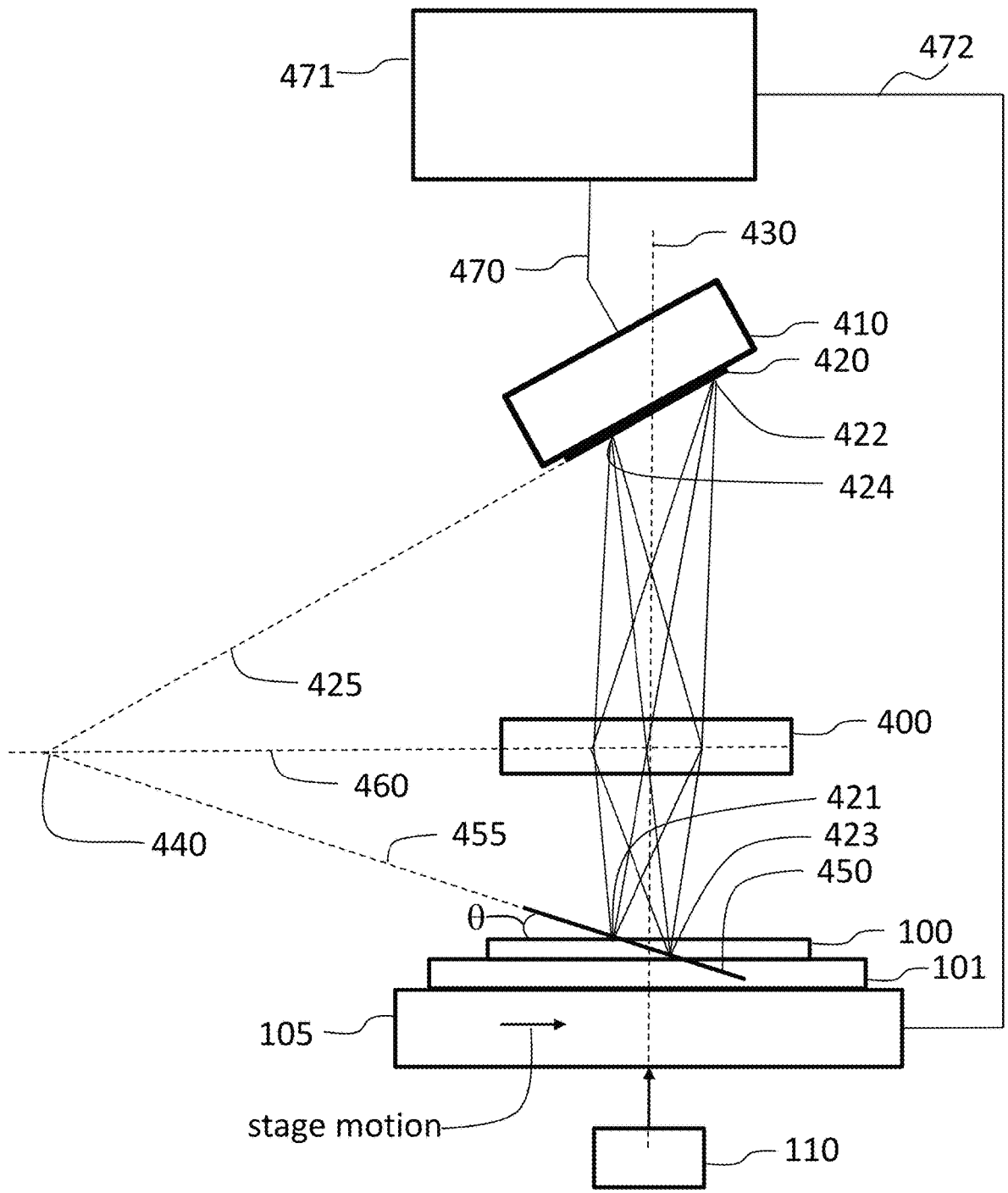
FIG. 4A shows an MSIA slide scanner using a tilted two-dimensional detector array which results in an object plane tilted in the scan direction.

FIG. 4A shows an MSIA slide scanner for transmission imaging according to a first embodiment. A tissue specimen 100 (or other specimen to be imaged) is mounted on microscope slide 101 (or other sample holder) on a scanning stage 105. For transmission imaging, the specimen is illuminated from below by light source 110. Brightfield imaging of microscope slides is usually accomplished using a white light source transmitted through the specimen from beneath. Microscope objective 400 (or other imaging objective) focuses light from the specimen onto a two-dimensional array of detector pixels 420, part of digital camera 410. Camera 410 (containing two-dimensional detector array 420 positioned at the image plane) is tilted (normally with respect to the plane of the microscope slide about an axis that is parallel to the plane of the microscope slide and is perpendicular to the direction of stage motion), and is normally parallel to the rows of pixels across the array (or two-dimensional array 420 is tilted inside camera 410, which is not tilted).

When focused by lens 400, light from tilted object plane 450 in specimen 100 is collected by detector pixels 420 at the image plane.

Light from an upper portion of specimen 100 (i.e., the top of specimen 100) at position 421 will be focused on a pixel in the row of pixels at first position 422 on image plane 420, and light from a lower portion of the specimen 100 (i.e., from the bottom of the specimen 100) at position 423 will be focused on a pixel at second position 424 on image plane 420.

Each row of pixels in detector 420 (rows pointing into the paper in this figure) generally collects data from a different depth inside specimen 100. As stage 105 moves microscope slide 101 to the right, the array detector 410 is triggered to collect a series of image frames of a tilted object plane 450 as it moves through the specimen, typically triggering each time the stage has moved the specimen a distance that is equivalent to the distance between pixels in each plane of the final 3D digital image stack. For example, if the final image pixels represent points in the specimen spaced one micron apart, then the detector 410 is triggered whenever the stage has moved a distance equal to one micron.

These images are read out from Camera 410 through connection 470, and may be stored in a memory device (i.e., a memory device on a computer 471), which may contains a frame grabber if necessary. In general, the computer 471 may include one or more processors for processing images.

Computer 471 may also control motion of stage 105 through connection 472, and may define and select active areas of rows of pixels in detector array 420.

Computer 471 (in particular one or more processors of the computer 471) may be programmed to perform MSIA averaging on the series of image frames captured from each of the active areas of rows of pixels in detector 420, and to finally assemble a stack of image planes starting at the top of specimen 100 and continuing down into the specimen.

Each active area of rows of pixels in detector 420 acts like a separate MSIA detector in this MSIA scanner, and here each active area of rows of detector pixels acquires a series of image frames that are averaged in the MSIA process to produce rows of image pixels that make up one plane inside the 3D image of the specimen. Thus, if three active areas are used, the final 3D image normally includes three image planes. If M active areas are used, then the final 3D image includes M image planes.

For large specimens, a 3D image of the entire specimen is typically collected by moving the microscope slide at constant speed using motorized stage 105 in a direction perpendicular to the tilt axis of detector array 410, resulting in collection of a digital 3D image stack of one strip of the specimen. Adjacent strips may then be scanned, and the 3D stack images of all strips can be combined to assemble a 3D image of the entire specimen, which includes a stack of two-dimensional images, where each 2D image in the stack has a depth of field that is greater than the depth of field of a 2D image acquired using a detector that is not tilted with respect to the scan plane, and an improved S/N because of MSIA averaging.

In some embodiments, instead of defining active areas of rows in the detector 420 and acquiring image data only from those areas, image data can be acquired from the entire area of the detector (or at least a substantial area of the detector). At least some active areas could then be defined by computer 471, discarding data from rows outside the defined active areas.

Generally, because of the tilt of the object plane 450, the depth of field of each image plane in the final 3D image will be increased by $d=(n-1)p*\tan\theta$ more than the depth of field of an MSIA image where the object plane is not tilted with respect to the scan direction ($\theta=0$). Here, d=increase in depth of field, p=distance between pixel positions in the object (specimen) scan plane, and n=the number of rows in an active area of the detector, and $\theta$ is the angle between the object plane and the scan plane.

Generally, the vertical distance between object planes depicted in the final 3D image stack (each of which has a depth of field D) is given by $X=Np*\tan\theta$, where X=the vertical distance between image planes in the 3D image stack (X is measured in the object space), N=the number of rows in the detector between the centres of adjacent active areas, and p is the distance between pixel positions in the object (specimen) scan plane.

In some embodiments, when the microscope optics causes geometric distortion in the image detected by detector 420, computer 471 may be programmed to correct distortion in the detected image frame (or the image detected from each active area of the detector) before image averaging in the MSIA process.

Returning again to FIG. 4A, first dashed line 430 is the optical axis of the instrument. Second dashed line 425 is an extension of image plane 420; third dashed line 460 is an extension of the lens plane, and fourth dashed line 455 is an extension of object plane 450. The second, third and fourth lines 425, 460, and 455 intersect at Scheimpflug line 440, a line perpendicular to the paper. This is the "Scheimpflug Rule", which is well-known in view camera photography (e.g. see "Using the View Camera" by Steve Simmons, Revised edition 1992, Published by Amphoto, N.Y., page 47). Also see British Patent #1196, "Improved Method and Apparatus for the Systematic Alteration or Distortion of Plane Pictures and Images by means of Lenses and Mirrors for Photography and for other purposes" by Theodor Scheimpflug, 1904.

Figure 4B:
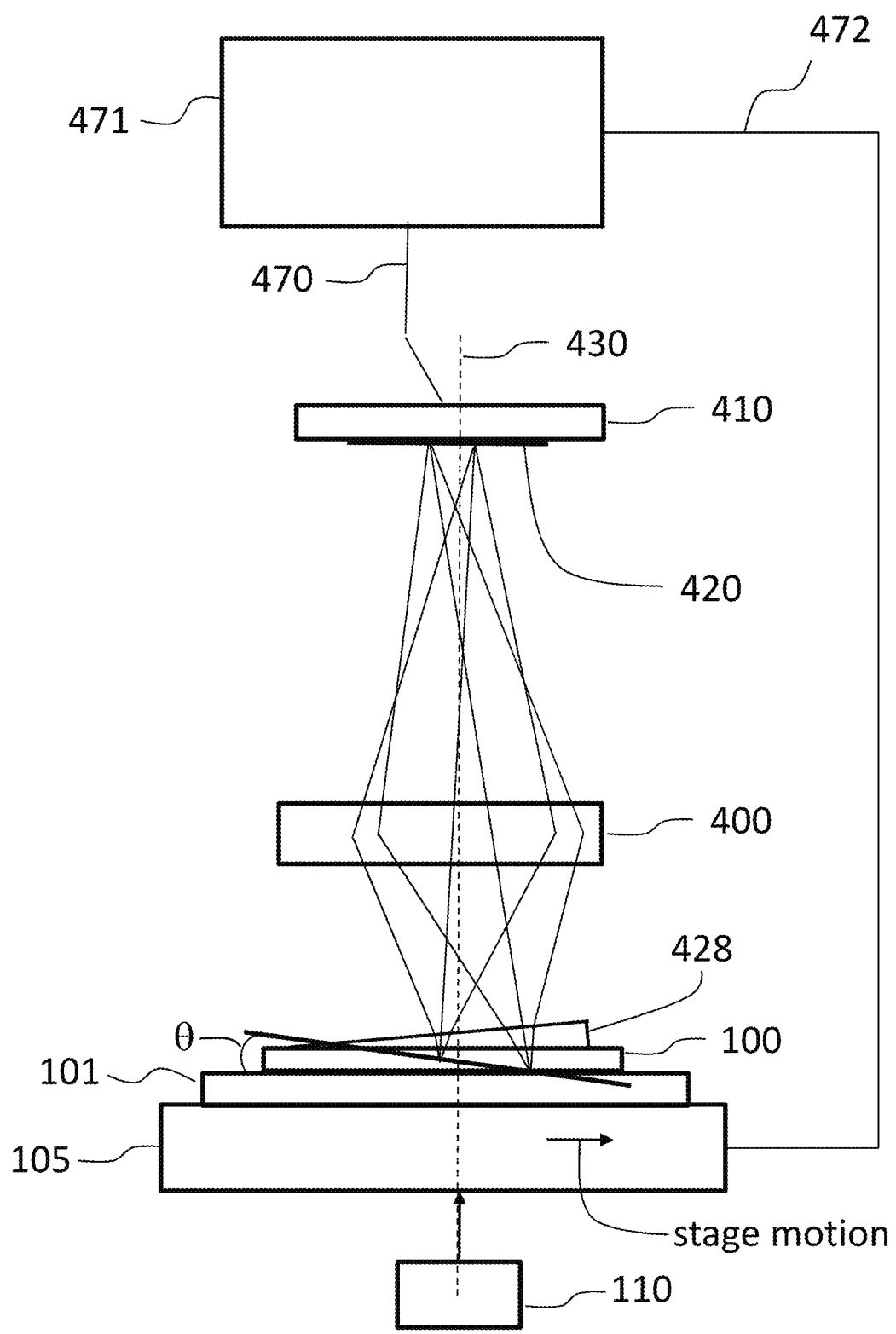
FIG. 4B shows an MSIA slide scanner using a glass wedge on top of the specimen to focus a real image of a tilted specimen plane onto a two-dimensional detector array that is perpendicular to the instrument axis

Turning now to FIG. 4B, this illustration shows a slide scanner like that in FIG. 4A, except a wedge 428 (typically made of glass or other light transparent or substantially transparent material) focuses light from object position 421 onto a detector pixel at 422, and light from object position 423 onto a detector pixel at 424, instead of onto virtual image positions at 426 and 427, which may be on the same tilted image plane of the microscope as in FIG. 4A. Insertion of glass wedge 428 has tilted the object plane 450 even though detector 410 is perpendicular to the instrument axis 430.

In some cases it may be appropriate to simply insert a glass wedge in front of the detector with the sharp angle of the wedge in the scan direction (or the opposite direction) instead of tilting the detector.

Figure 5:
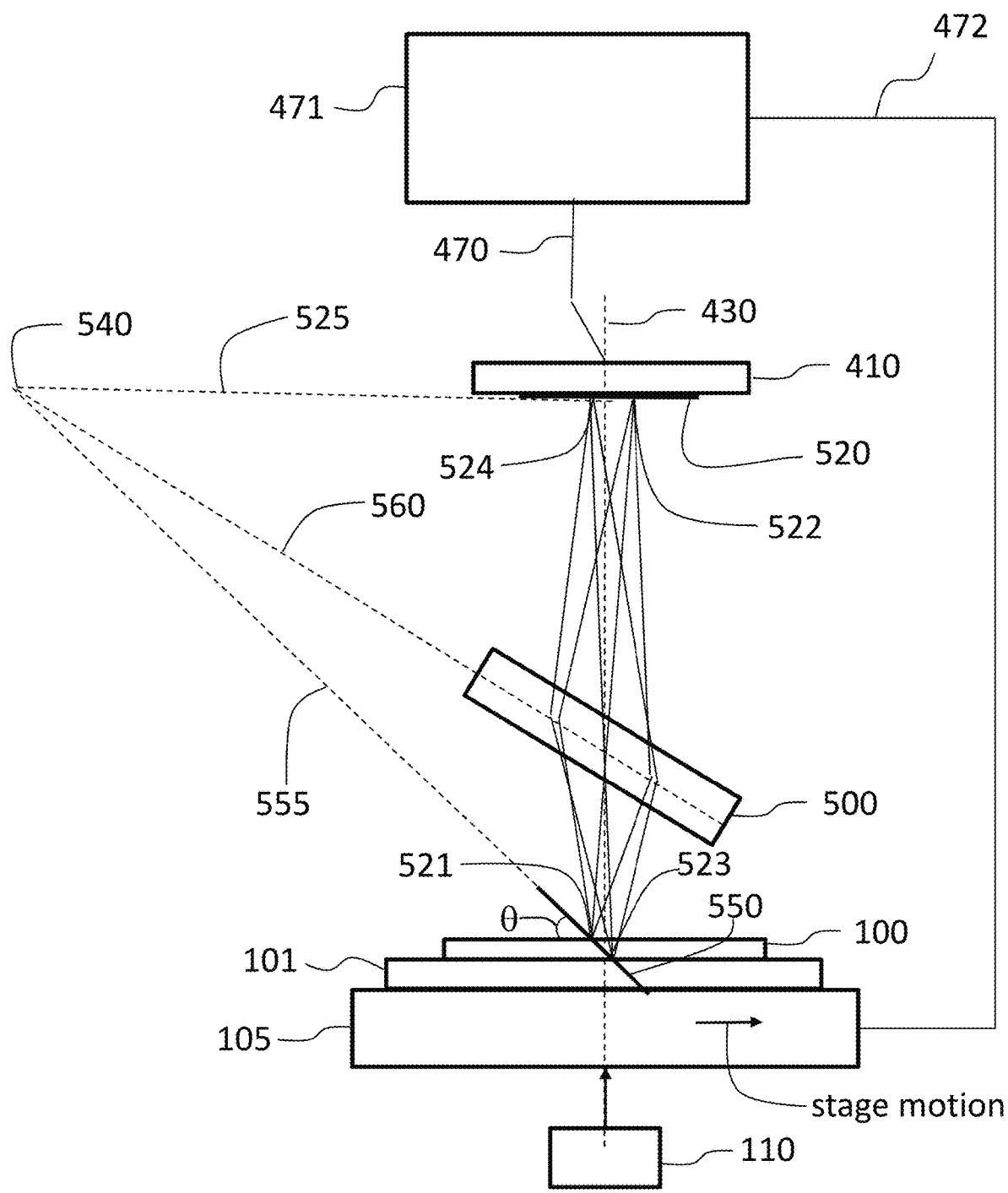
FIG. 5 shows an MSIA slide scanner in which a tilted object plane is caused by tilting the imaging lens.

Turning now to FIG. 5 this illustration shows a slide scanner for transmission imaging according to a second embodiment. A tissue specimen 100 (or other specimen to be imaged) is mounted on microscope slide 101 (or other sample holder) on a scanning stage 105, which is controlled by Computer 471 through connection 472. For transmission imaging, the specimen is illuminated from below by light source 110.

In this embodiment, microscope objective 500 (or other imaging objective) is tilted with respect to the specimen 100 and focuses light from the specimen onto two-dimensional detector array 410, which is perpendicular to optical axis 430. When focused by lens 500, light from tilted object plane 550 in specimen 100 is collected by detector pixels in image frame 520.

As shown, in this embodiment light from the top of specimen 100 at first position 521 will be focused on a pixel in the row of pixels at first position 522 on image plane 520, and light from the bottom of the specimen at second position 523 will be focused on a pixel at position second 524 on image plane 520.

Each row of pixels in detector 410 (rows pointing into the paper in this figure) collects data from a different depth inside specimen 100.

As stage 105 moves microscope slide 101 to the left, the array detector 410 is triggered to collect a series of image frames of the tilted object plane 550 as it moves through the specimen. These image frames are stored in a computer 471, and MSIA image averaging of data from each active area of the detector array is used to assemble a digital 3D stack of image planes. The final result is an MSIA three-dimensional image of the specimen comprised of a stack of two-dimensional image planes, one image plane for each active area in the detector array.

Note that in this embodiment the image circle of objective lens 500 should be large enough to include the area subtended by the detector pixels in two-dimensional detector array 410, which is not centered on the optical axis of imaging objective lens 500.

In FIG. 5, first dashed line 430 is the optical axis of the instrument. Second dashed line 525 is an extension of image plane 520; third dashed line 560 is an extension of the lens plane, and fourth dashed line 555 is an extension of object plane 550. The lines 525, 560 and 555 intersect at Scheimpflug line 540, a line perpendicular to the paper, just as they did in FIG. 4.

When the optical system includes an infinity-corrected objective and tube lens, typically only the infinity-corrected objective needs to be tilted to achieve the same effect as the arrangement shown in FIG. 5.

Figure 6:
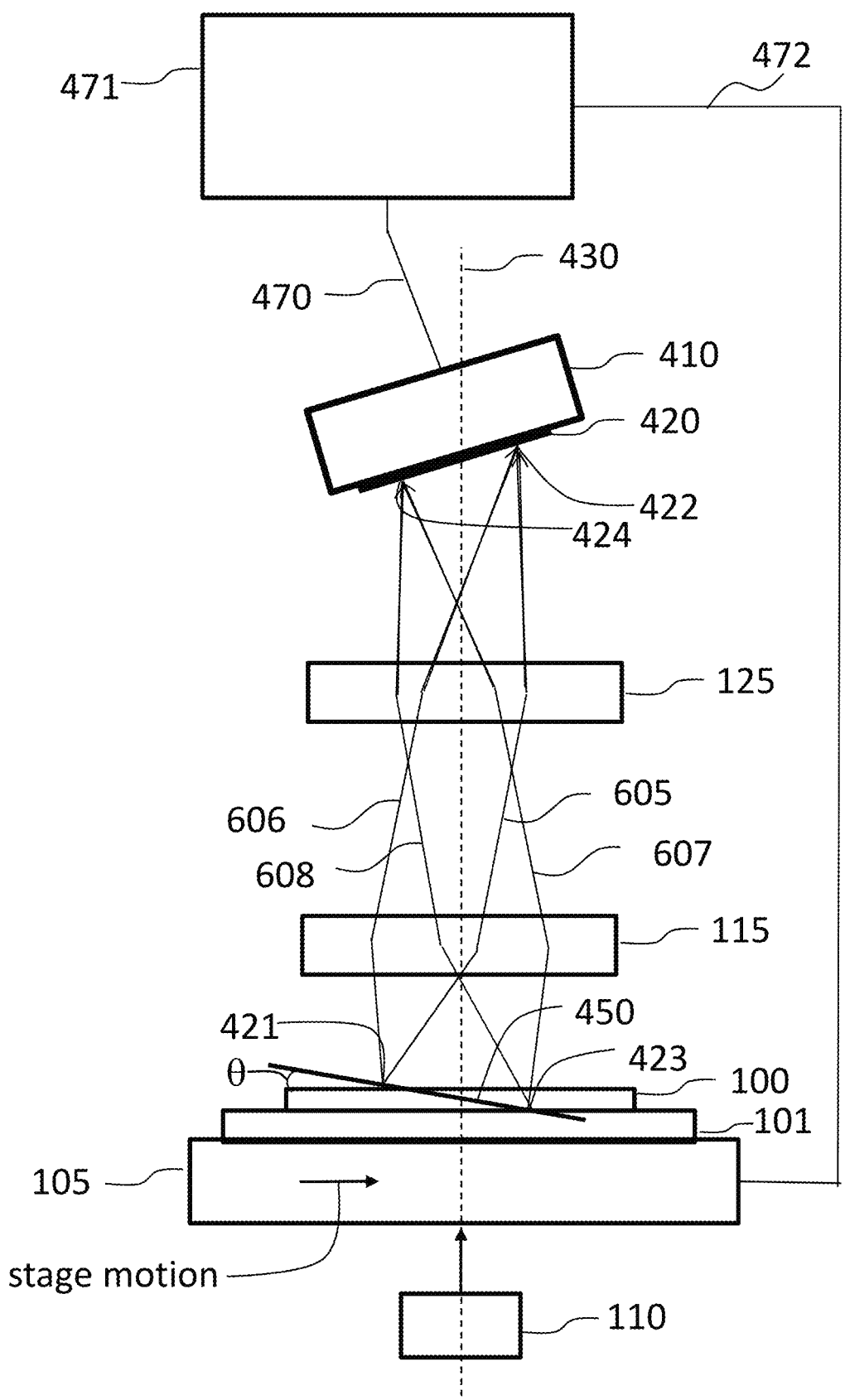
FIG. 6 shows an MSIA slide scanner for brightfield imaging with an infinity-corrected microscope objective and a tube lens in which a two-dimensional detector array is tilted to provide an object plane tilted in the scan direction.

FIG. 6 shows a slide scanner for MSIA transmission imaging according to a third embodiment. A tissue specimen 100 (or other specimen to be imaged) is mounted on microscope slide 101 (or other sample holder) on a scanning stage 105. For transmission imaging, the specimen is illuminated from below by light source 110. A combination of infinity-corrected microscope objective 115 (or other infinity-corrected imaging objective) and tube lens 125 focuses light from the specimen onto two-dimensional detector array 420, which is tilted with respect to the plane of the microscope slide about an axis that is in the plane of the microscope slide and is perpendicular to the direction of stage motion.

When focused by objective 115 and tube lens 125, light from tilted object plane 450 in specimen 100 is collected by detector pixels in detector array 420 at the image plane. In particular, in this embodiment light from the top of specimen 100 at first position 421 will be focused to a nearly-parallel beam by objective 115 (the outside of this parallel beam depicted by rays 605 and 606) and focused by tube lens 125 onto a pixel in the row of pixels at first position 422 on image plane 420, and light from the bottom of the specimen at second position 423 will be focused by objective 115 to a nearly-parallel beam represented by rays 607 and 608 and then focused by tube lens 125 onto a pixel at position 424 on image plane 420.

Each row of pixels in detector 410 (rows pointing into the paper in this figure) collects data from a different depth inside specimen 100.

As stage 105 moves microscope slide 101 to the right, the array detector 410 is triggered to collect a series of image frames of the tilted object plane 450 as it moves through the specimen. These image frames are stored in a computer, MSIA averaging is performed on data from each active area of the detector, and finally assembled into a stack of digital 3D image planes starting at the top of specimen 100 and continuing down into the specimen. Each active area of rows of pixels in detector array 420 produces one image plane in the stack of image planes that comprises the 3D MSIA image of the specimen.

Note that in this diagram, stage motion is to the right, and with the sensor array tilted in the direction shown, an image of the top of the specimen will be at the top of each image frame as it is acquired since typically the reference surface is at the top of the specimen. The shape and position of the reference surface in the frame image will be measured before the rest of the specimen (at greater depth below the specimen surface) is imaged in subsequent image frames, which is useful to set the shape and position of the active areas as parts of the specimen at greater depth below the specimen surface pass under the position where the reference surface intersected the earlier frame image.

In some cases, the direction of stage motion can be reversed, in some cases with or without changing the angle of the detector 420. For instance, in one example if the array detector 410 is tilted through the same angle, but in the opposite direction, the direction of stage motion can be reversed, and the instrument can be used as a bidirectional scanner by reversing the detector tilt each time the scan direction is reversed. In other cases, the direction of stage motion can be reversed without changing the angle. This is generally true for all of the embodiments shown and described in this document.

Figure 7:
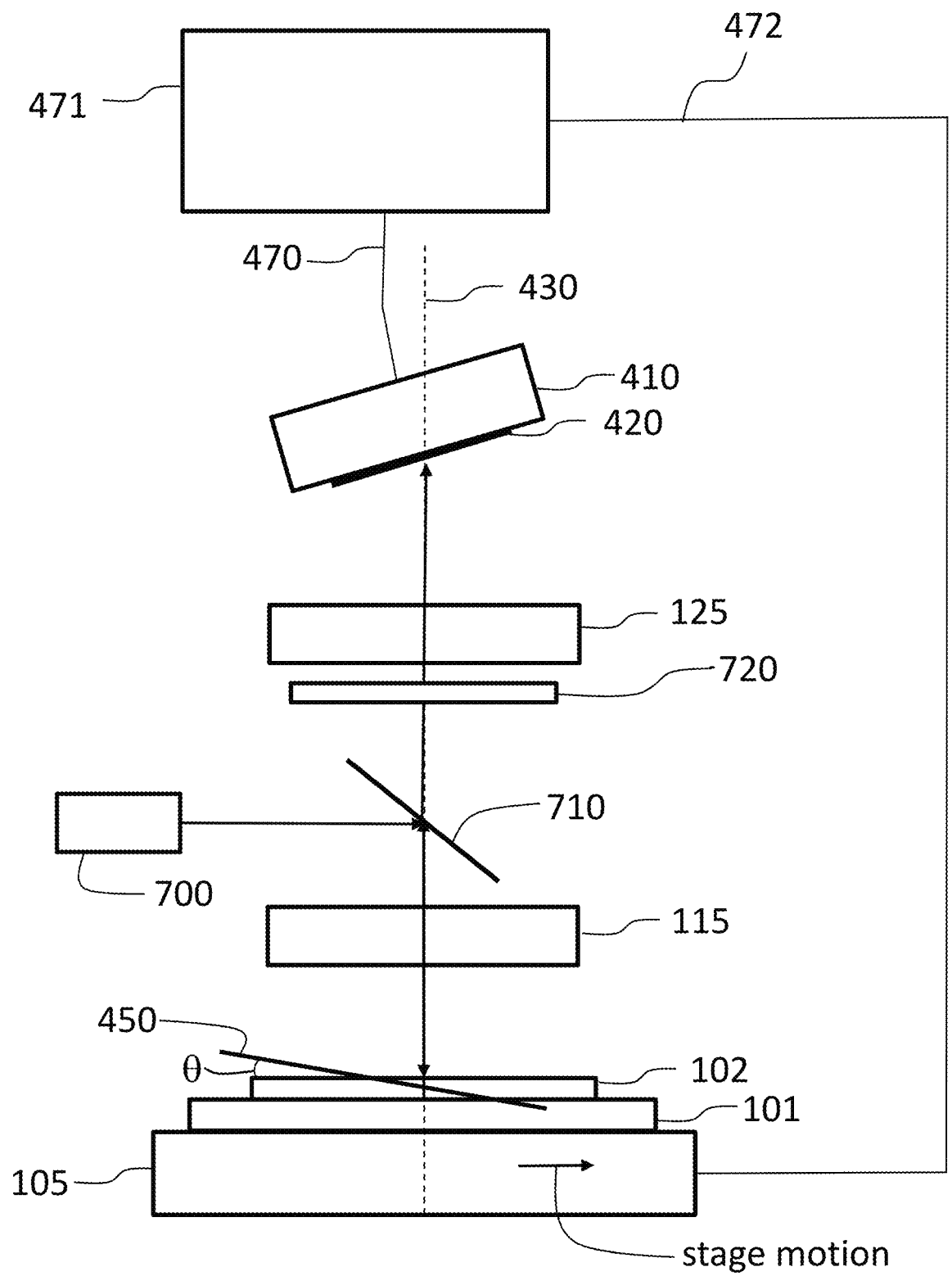
FIG. 7 shows an MSIA slide scanner for fluorescence imaging with an infinity-corrected microscope objective and a tube lens in which a two-dimensional detector array is tilted to provide an object plane tilted in the scan direction.

FIG. 7 shows a slide scanner for reflection or fluorescence imaging according to a fourth embodiment. This diagram is similar to FIG. 6, except that transmission light source 110 has been replaced by fluorescence (or reflected light) illumination source 700. When used for fluorescence or photoluminescence imaging, the tissue specimen is illuminated from above by illumination source 700, mounted above the specimen (epifluorescence) so that illumination light that passes through the specimen is not mixed with the weaker fluorescence emission from the specimen, as it would be if the fluorescence illumination source were below the specimen.

Figure 1:
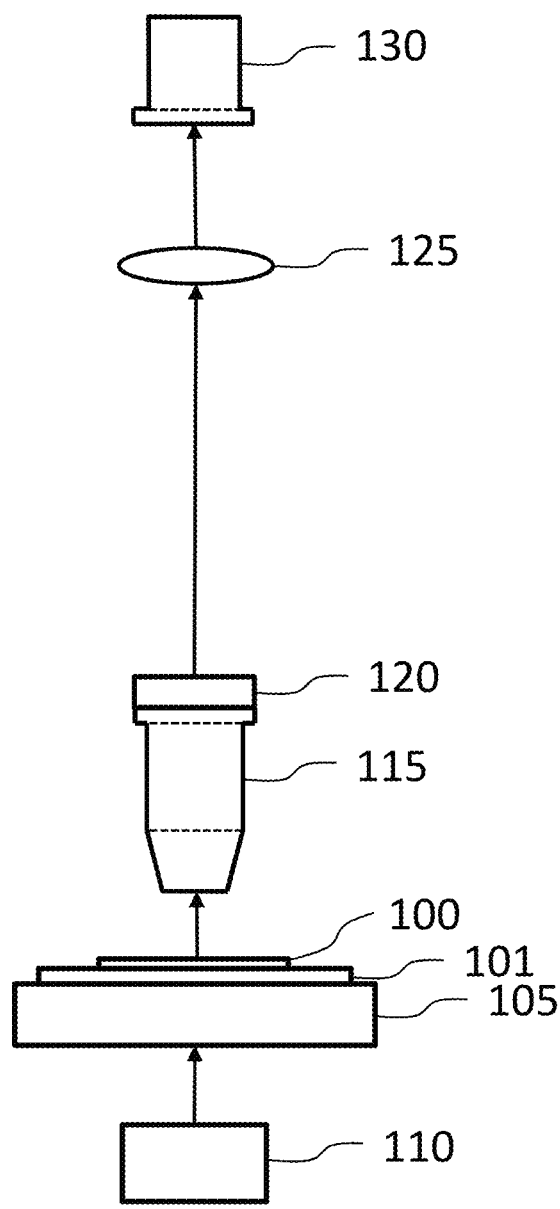
FIG. 1 is a schematic view of a brightfield microscope slide scanner using a linear detector array.
Figure 2:
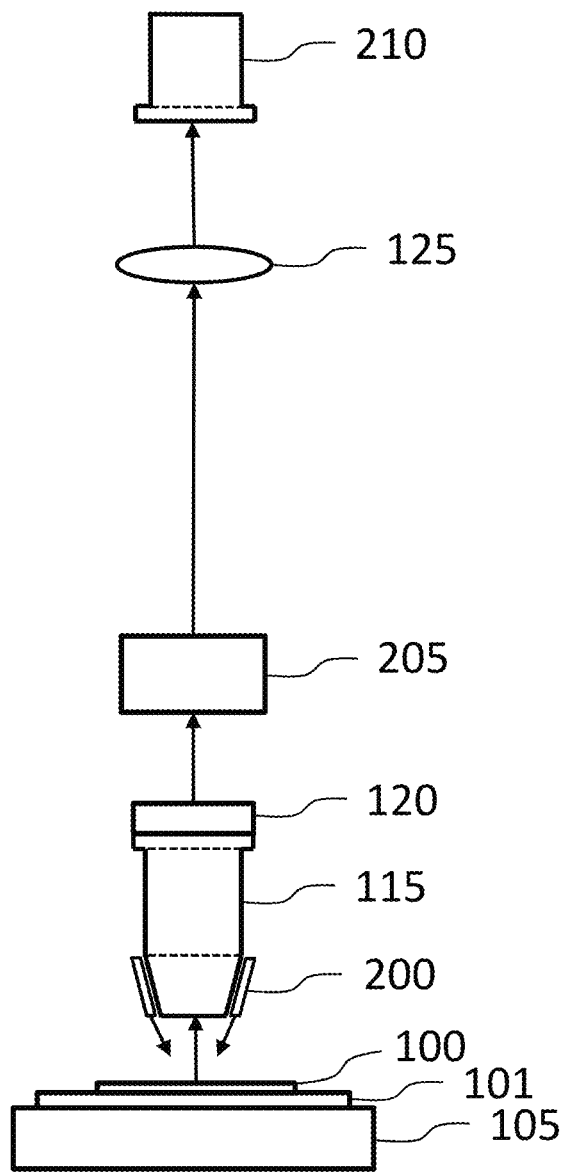
FIG. 2 is a schematic view of a fluorescence microscope slide scanner using a TDI detector array.

Several different optical combinations can be used for epifluorescence illumination—light from a source mounted on the microscope objective, as shown in FIG. 2; illumination light that is injected into the microscope tube between the microscope objective and the tube lens, as shown in FIG. 7, using a dichroic beamsplitter 710 to reflect it down through the microscope objective and onto the specimen; and several others.

A narrow wavelength band for the illumination light is chosen to match the absorption peak of the fluorophore (or fluorophores) in use. This narrow-band illumination may come from a filtered white-light source, an LED or laser-based source (including a laser sent through a diffuser plate in rapid motion to eliminate speckle), or other source.

Fluorescence emitted by the specimen is collected by infinity-corrected microscope objective 115 (or other high-numerical-aperture objective lens). Emission filter 720 is typically chosen to reject light at the illumination wavelength and to pass the emission band of the fluorophore in use.

As stage 105 moves microscope slide 101 to the left, the array detector 410 is triggered to collect a series of image frames of the tilted object plane 450 as it moves through the specimen. These image frames are stored in a computer, MSIA averaging is performed on data from each active area of the detector, and finally assembled into a stack of digital 3D image planes starting at the top of specimen 102 and continuing down into the specimen. Each active area of rows of pixels in detector array 420 produces one image plane in the stack of image planes that comprises the 3D MSIA image of the specimen.

For multi-spectral fluorescence imaging, emission filter 720 can be replaced by a tunable filter. The tunable filter can be set to transmit a band of emission wavelengths from one fluorophore (or other fluorescent source) and an MSIA strip image stack calculated and recorded for that source, followed by setting a second wavelength band for a second fluorophore to record an MSIA strip image stack for that source, and so on until a strip image stack has been recorded for each fluorescence source in the specimen.

In some embodiments, the strip image stacks from multiple fluorophores can either be viewed separately or combined into a single 3D image (usually false coloured) and the strips can then be assembled into a single 3D image of the entire specimen. In some cases, emission filter 720 can be removed from the optical system when the instrument is used for reflected-light imaging.

The microscope objective 115 and tube lens 125 form a real image of the specimen on tilted two-dimensional detector array 420. A 3D image of the specimen is collected by moving the microscope slide at constant speed using motorized stage 105 in a direction perpendicular to the tilt axis of detector array 410.

As stage 105 moves microscope slide 101 to the left, the array detector 420 is triggered to collect a series of image frames of the tilted object plane 450 as it moves through the fluorescence specimen 102, acquiring an image frame from the tilted detector array whenever the stage has moved a distance equivalent to the distance between pixels in each plane of the final 3D digital image stack. One plane in the 3D image stack is produced using MSIA to average pixel data from each active area of the detector.

When used for brightfield imaging, a transmitted-light illumination source (i.e., source 110 as shown in FIG. 6) is used instead of illumination source 700 (which illuminates the specimen from above) and emission filter 720 and dichroic filter 710 can be removed from the optical train.

Figure 8:
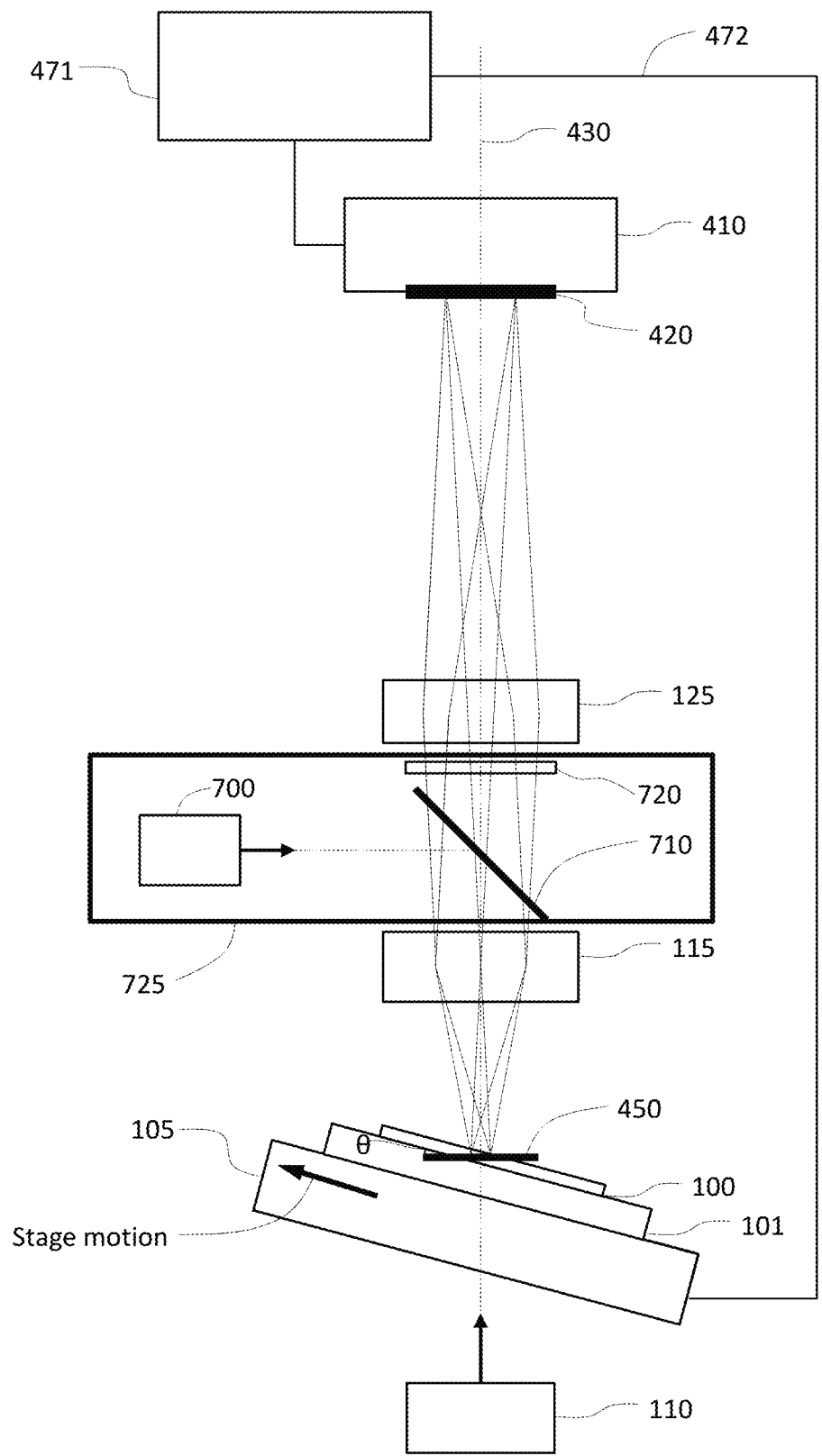
FIG. 8 shows an MSIA slide scanner for fluorescence and/or brightfield imaging in which the object plane is horizontal and the scan plane is tilted.

FIG. 8 shows a slide scanner for MSIA brightfield and/or fluorescence imaging according to a fifth embodiment. A tissue specimen 100 (or other specimen to be imaged) is mounted on microscope slide 101 (or other sample holder) on a scanning stage 105.

In this embodiment, microscope stage 105 is tilted with respect to the optical axis 430 of the microscope (as shown), and the scan plane, microscope slide 101 and specimen 100 are all tilted with respect to the object plane 450. Object plane 450 and detector array 420 are both perpendicular to the optic axis 430 in this embodiment.

For brightfield transmission imaging, the specimen is illuminated from below by light source 110, and the epi-illumination optics 725 is removed from the microscope tube. Light from object plane 450 in specimen 100 is collected by infinity-corrected microscope objective 115 and focused onto detector array 420 by tube lens 125.

When used for fluorescence imaging, epi-illumination optics 725 is placed in the microscope as shown in the diagram. Light source 700 is tuned to produce a narrow band of wavelengths to excite fluorophores in a fluorescence specimen. Illumination from light source 700 is partially reflected by beamsplitter 710 to illuminate the specimen from the top (this is called epi-illumination). Fluorescence from object plane 450 in the specimen is collected by infinity-corrected microscope objective 115, passes through beamsplitter 710 and emission filter 720 and is focused by tube lens 125 onto array detector 420 (which when used for fluorescence imaging is usually a monochrome detector array).

Two-dimensional detector array 420 in this embodiment is perpendicular to the optical axis 430 of the microscope. When focused by objective 115 and tube lens 125, light from tilted object plane 450 in specimen 100 is collected by detector pixels in detector array 420 at the image plane.

As stage 105 moves microscope slide 101 to the left, the array detector 420 is triggered to collect a series of image frames of the tilted object plane 450 as it moves through the specimen. These image frames are stored in a computer, MSIA averaging is performed on data from each active area of the detector, and finally assembled into a stack of digital 3D image planes starting at the top of specimen 100 and continuing down into the specimen. Each active area of rows of pixels in detector array 420 produces one image plane in the stack of image planes that comprises the 3D MSIA image of the specimen.

In some cases, the direction of stage motion can be reversed, in some cases with or without changing the angle of the scanning stage 105. For instance, in one example if the scanning stage 105 is tilted through the same angle, but in the opposite direction, the direction of stage motion can be reversed, and the instrument can be used as a bidirectional scanner by reversing the stage tilt each time the scan direction is reversed. In other cases, the direction of stage motion can be reversed without changing the angle.

Figure 9:
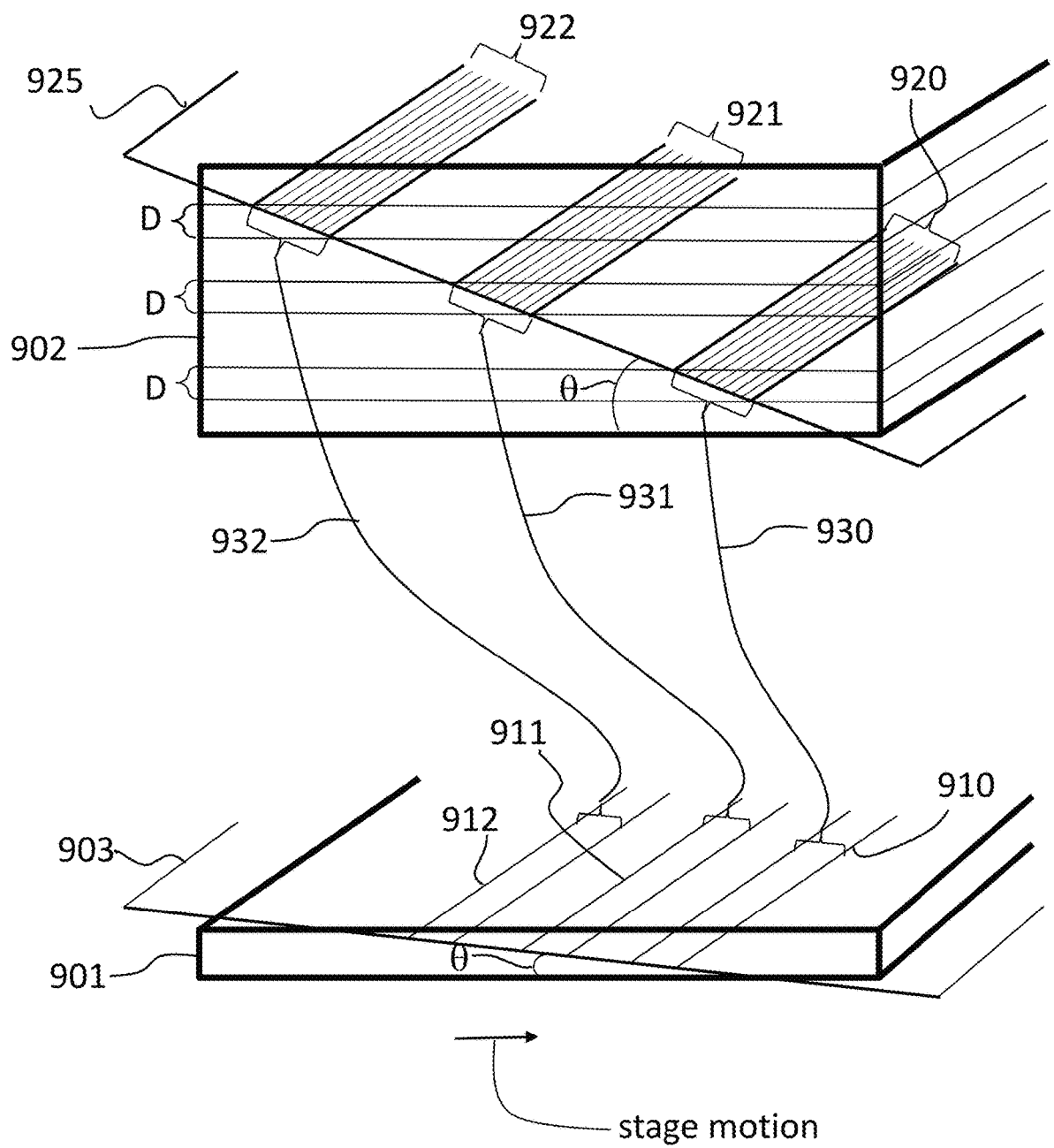
FIG. 9 illustrates how a digital 3D MSIA image stack of one strip across the specimen is produced by the scanners described in FIGS. 4, 5, 6, 7 and 8.

FIG. 9 illustrates how a digital 3D MSIA image stack of the specimen is produced by the MSIA scanners with a tilted object plane like those described in FIGS. 4, 5, 6, 7 and 8. For instance, FIG. 9 (bottom) shows the tilted object plane 903 at one instant in time as it moves through specimen 901. At this instant in time, a tilted 2D sensor has three narrow rectangular active areas of rows of detector pixels (typically spaced equal distances apart). For this example, which is just one of many possible combinations, the tilt angle of the object plane may be one degree, each active area may contain 10 rows of pixels (although larger or smaller active areas are also possible)—and the active areas are 100 rows of pixels apart. The sensor acquires image data from three narrow rectangular areas 910, 911 and 912 in the object plane 903.

The image data acquired from these three areas includes the data stored in areas 920, 921 and 922 in tilted image frame 925 (acquisition, transfer and storage of this data shown by virtual connections 930, 931 and 932).

As the scan continues, each time an image frame is acquired, data is stored in computer memory representing another tilted image frame as the specimen moves a short distance in the scan direction (usually a distance equal to a small integer times the distance between pixel positions in the object space, where the most common integer is 1), and the pixel data representing each object point is averaged or added together as the optical image of that point passes across the ten rows of detector pixels in one active area.

Because the tilt angle θ (theta) is small, the image pixels representing the same object point in the ten successive image frames will overlap in the vertical direction, and when the ten detector pixel data are added together, the result is a single image pixel in one of the 3D image planes having unchanged resolution in the horizontal directions, but increased depth of field in the vertical direction.

In this example, assuming a 1 degree tilted object plane, and a thin lens of focal length 9.524 mm (approximately equivalent to a series combination of the microscope objective with focal length 10 mm and the tube lens with focal length 200 mm), the tilt angle of the image frame (and the detector 410) will be 19 degrees.

In this example, assume the distance between object pixel positions is 0.25 microns, and an image is exposed each time the stage moves 0.25 microns. If the optical magnification of the microscope optics is 20×, the tilt angle of the specimen is one degree, and an image frame is acquired each time the stage moves a distance equal to 0.25 microns, the tilted images 920, 921 and 922 acquired by three active areas of pixels in the 2D sensor are spaced 5 microns apart in the image sensor plane (the distance between rows of pixels in the sensor) and 5*sin(19 degrees)=1.63 microns apart in the vertical direction (in the image space).

After MSIA averaging of the thousands of image frames of pixel data acquired in a typical scan across the specimen, each pixel in each of the resulting horizontal image planes in the 3D image stack will have been averaged 10 times with the data representing the same object pixel position in the successive image frames, resulting in an increase in S/N of the square root of 10, and a slight increase in the depth of field of each pixel in the resulting 3D image plane because of the slight tilt of the successive image frames.

If the angle θ (theta) is 1 degree, as in the example above, and the three active areas each contain 10 rows of pixels, and the active areas are 100 rows of pixels apart, the final result is a 3D image stack including three image planes that represent planes that are 100*sin(1 degree)=1.75 microns apart (in the vertical direction) in object space (in the specimen). Also it should be noted that the top image plane in the 3D image stack must be translated 200 pixel positions to the right and the middle image plane 100 pixel positions to the right so that the three image planes in the 3D image stack are registered in the vertical direction.

This simple example for obtaining a 3D image stack of a microscope specimen has resulted in a 3D image comprised of 3 image planes in the 3D image stack, each plane with improved S/N because of MSIA averaging. Many variations are possible: Increasing the number of rows in each of the active areas in the sensor array will increase the S/N improvement, and at the same time increase the depth of field of each of the image planes in the 3D image stack. If more active areas are used, the number of image planes in the 3D image stack is increased.

The distance between planes in the 3D image stack can be changed by varying the distance between active areas. The angle between the image sensor and the scan plane can also be varied.

If the entire area of the sensor is one active area, the depth of field of the resulting single image plane can be as large as the entire thickness of the microscope specimen.

In some embodiments, instead of choosing active areas before reading out data from the area sensor, the entire sensor can be read out each time, and then data can be chosen from each image frame using software to define an active area (or areas) on the detector, discarding data in the frame image that is not part of the defined active area (or areas). When active areas are defined in software, it may be possible to define overlapping active areas, so that the depth of field of image planes in the 3D image stack can overlap.

If the optics of the microscope scanner produces geometric distortion in the image frames, it may be helpful to correct each image frame for geometric distortion in software before performing MSIA averaging (unless the position of pixels in the 2D sensor array has been distorted during manufacture of the sensor array to match the geometric distortion produced by the optics of the scanner).

Figure 10:
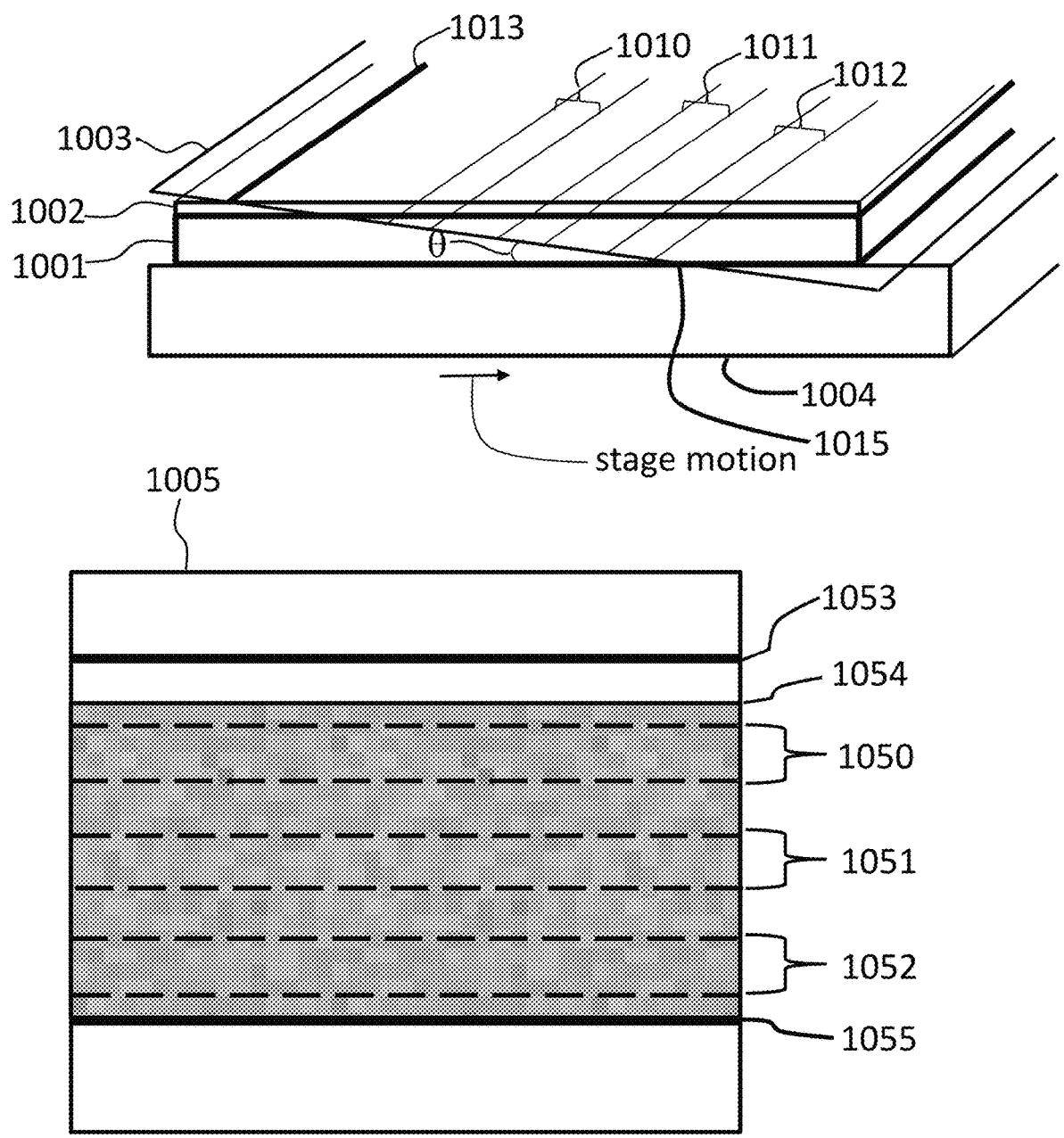
FIG. 10 is a schematic diagram showing the position of one tilted image frame cutting through a specimen on a microscope slide.

FIG. 10 (top) shows a schematic view of object frame 1003 moving through a specimen as the scan proceeds. Object frame 1003 illustrates the 2D area of the specimen 1001 that is represented in image frame 1005. The specimen 1001 is covered by a cover slip 1002, and is mounted on microscope slide 1004. The object frame 1003 is tilted by a small angle θ (theta) in the scan direction (the direction of stage motion in this example). As the stage moves from left to right, the object frame has relative motion from right to left through the specimen. Three narrow active areas 1010, 1011 and 1012 are represented inside the object frame. FIG. 10 (bottom) shows the frame image 1005 detected at the same instant as shown in the top figure. A first line 1053 across the top of the image represents a bright reflection from the top of coverslip 1002 (shown as 1013 in object frame 1003) and a second line 1054 represents a reflection from the bottom of the coverslip (which usually is in contact with the top of specimen 1001. (In some cases no coverslip is used, and in that case reflection 1053 is absent and second line 1054 may represent the top of the specimen.)

The grey area in the frame image 1005 represents image data from inside the specimen. The top of the microscope slide 1015 may also be visible as a reflection 1055 at the bottom of the specimen (the bottom of the grey area). In this example, we assume the specimen is flat with constant thickness, and the coverslip (if there is one) is flat and always in contact with the top of the specimen.

In this case, the position of the active areas 1050, 1051 and 1052 (which represent images of areas inside the specimen 1010, 1011 and 1012) can be chosen so they always represent areas inside the specimen (inside the grey area of the diagram) and a constant distance below the top (or bottom) of the coverslip. In some cases, the position of the image of the coverslip reflection in the frame images can be used to automatically reposition the active areas in the detector array, during scan, without prior knowledge of the best focus position in the specimen, thus acting as an automatic focus and follow focus without requiring a mechanical change of the optical focus position.

In this case, the active areas shown in the diagram can remain in the same positions in the frame images as the scan proceeds, and the result will be a 3D set of three plane image strips of equal depth of field. To register the three image planes in the vertical direction the top plane should be translated a number of pixels to the right (in the scan direction) equal to 2N and the middle plane a number of pixels equal to N where N is the number of pixels between the centers of adjacent active areas in the sensor array.

When the specimen is not flat, or is tilted in the scan direction, or is tilted about the scan direction, or a combination of these three, the situation may be more complex. For example, suppose the specimen thickness is increasing in the direction opposite to the direction of motion of the microscope stage, and is also increasing non-linearly in the perpendicular direction, as shown schematically in FIG. 11.

Figure 11:
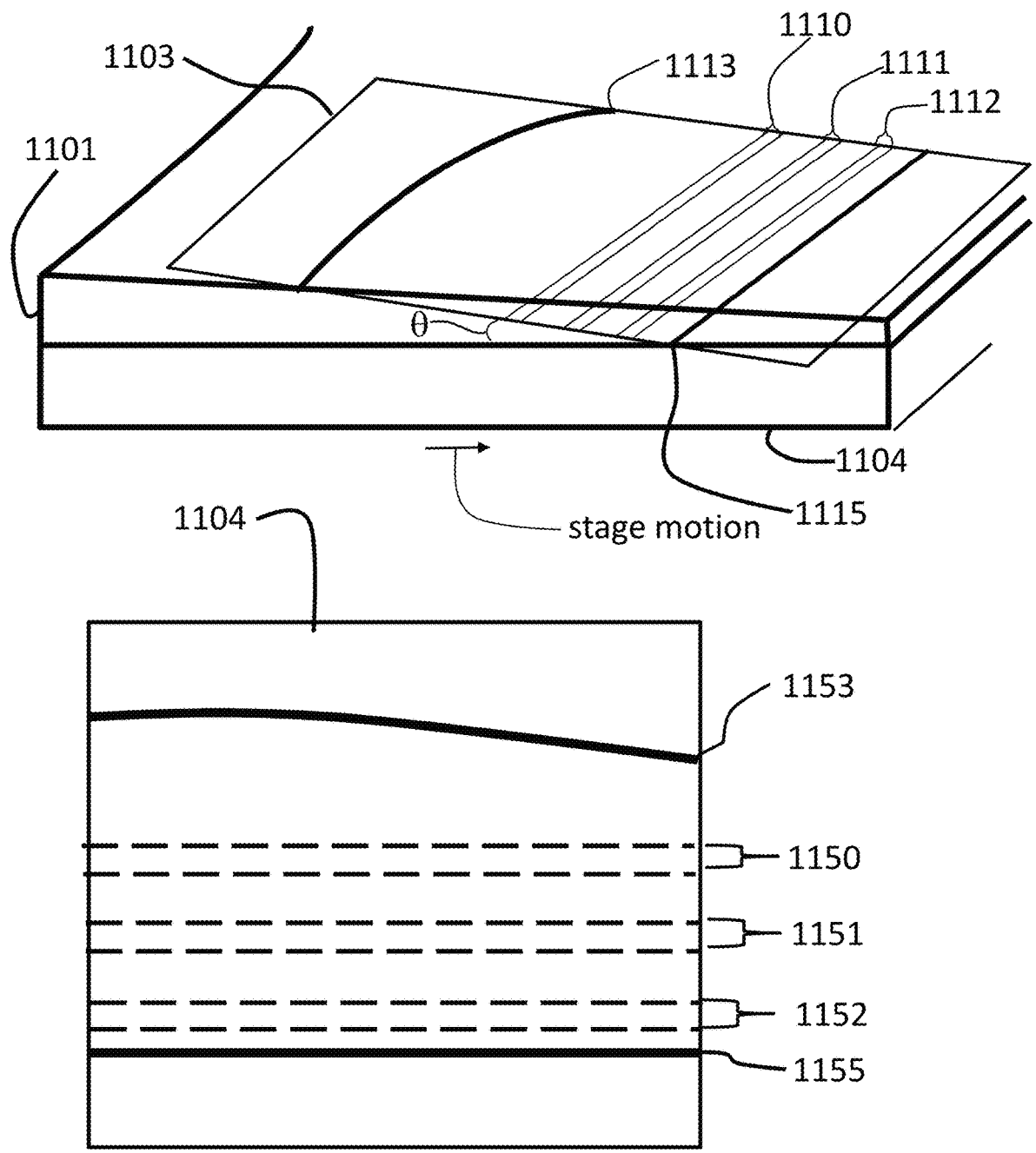
FIG. 11 illustrates how the position of the image of the curved surface of a specimen in an image frame relates to the positions of active areas in the sensor to be used in image frames acquired later in the scan.

Specimen 1101, as shown at the top of FIG. 11, is increasing in thickness from right to left, and from front to back. Specimen 1101 is mounted on microscope slide 1104 which is moving from right to left during the scan. For this example, assume that three active areas 10 pixels high and 100 pixels apart have been chosen. Frame image 1104 shows an image of the specimen area 1103 that is inside the specimen. The reflection 1113 from the top of specimen 1101 is shown as line 1153 in the image frame 1104, the initial position of three active areas 1150, 1151, and 1152, and the reflection 1155 of the top of the microscope slide 1104. For this example, assume that the active areas are 10 pixels high (and extend across the entire width of the array) and that they define three image planes inside the specimen.

If active areas have been chosen on the array (as opposed to using software to define active areas in the image frame), these image planes will not tilt, or move up or down with respect to the surface of the specimen (unless the position of the chosen active areas in the detector array is changed during scan to follow the up/down motion of the surface of the sample), unless a mechanical tilt or focus change is used to follow the surface of the specimen. Moreover, even when mechanical tilt and/or focus change is introduced (or the position of the chosen active areas is changed during scan), the final image will not have the same shape as the specimen surface.

As the scan proceeds, each pixel in one of the three 3D image planes is the result of MSIA averaging (or addition) of 10 pixels, each from one of 10 adjacent frame images acquired at adjacent scan positions, from each of the columns of pixels across the height of the active area (where here the image frame is defined to have rows of pixels in the direction perpendicular to the scan direction, and columns of pixels in the scan direction—for example, if the sensor is 4000×3000 pixels in size, the active area 1150 is described as being 10 rows high and 4000 columns wide. Also it is important to note that the pixels in the image planes beneath those in the reflection image 1153 are not acquired during scan until active area 1150 moves under the position where 1153 was previously imaged, then later 1151 moves under this position, and finally 1152 move under this position. The three image planes are offset from each other and from the image position where surface reflection 1153 was originally imaged.

To clarify this situation, if the positions of active areas 1150, 1151 and 1152 in the detector array are adjusted during scan, they should be adjusted so that when acquiring images of the part of the specimen directly below the position of surface reflection 1153, each active area should have the same position in the detector array as existed when acquiring the image frame where surface reflection 1153 was imaged (which we call Frame R) when the volume of specimen below that point on the surface is imaged.

If the image of surface reflection 1153 occurs in image frame 1104 1000 pixels (1000 exposures) before active area 1150 reaches that same position in the image frame, then the correct position and shape for active area 1150 in image frame R+1000 is the same as it was in Frame R, not a position relative to the new position of surface reflection 1153 in Frame R+1000. In the same way, the position and shape of active area 1151 in Frame R+1100 should be the same as it was in Frame R, and the position and shape of active area 1152 in Frame R+1200 should also be the same as it was in Frame R.

When software is used to define active areas inside the frame image (a "software defined active area", or SDAA), instead of defining active areas in the sensor (where active areas are typically only rectangular in shape), the shape of active areas can be changed to match the shape of the reflection from the top surface of the specimen (or of another surface that is chosen as a reference surface). This allows image strips to be acquired that are no longer planes, but which have the same shape, or a similar shape, as the specimen surface above them (representing 3D surfaces instead of 3D planes).

Figure 12:
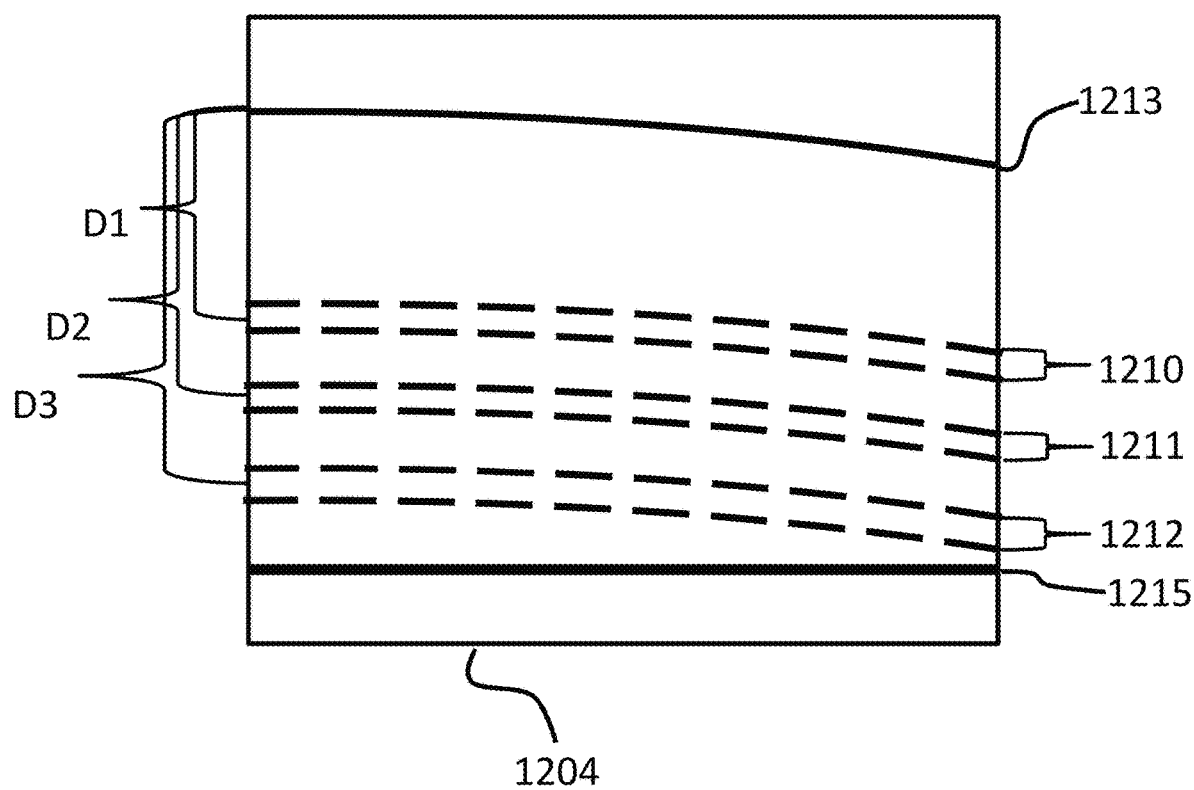
FIG. 12 illustrates how the position and shape of the image of the curved surface of a specimen in a frame image can be used to define in software both the position and shape of active areas in an image frame to be used in image frames acquired later in the scan.

FIG. 12 shows a frame image 1204 in which the reflection 1213 of the top surface of the specimen is curved in the plane of the frame image because both the thickness and shape of the specimen is not constant. Using the same example as before (active areas in the image frame 10 rows of pixels high and the width of the frame, and spaced 1000, 1100 and 1200 pixels after the position of reflection 1213 respectively), the first software defined active area 1210 (or SDAA) images a region below the surface of the specimen 10 pixels wide that is directly below the position originally defined by reflection 1213 that will be imaged during the scan 1000 exposures after the image frame shown in FIG. 12 is acquired, and this position and shape for active area 1210 should be used when performing the MSIA calculation for the frame image 1000 exposures after frame image 1204 was exposed.

100 frames later, the area of the specimen defined by SDAA 1211 will be under the position surface reflection 1213 occupied when it was imaged, and an additional 100 frames later the area described by SDAA 1212 will be under that same position. During MSIA scanning, the position of the SDAAs to be used in the image frame being acquired will be the same as defined by frame images 1000, 1100, and 1200 exposures earlier in the scan, and the position of active areas that will be used 1000, 1100 and 1200 exposures later will be set by the position and shape of the reference reflection 1213 (or other reference) in that image frame. In more general terms, the shape and position of active areas that are defined in one image frame must be synchronized for MSIA data acquisition from image frames later in the scan, with each active area being used in later image frames as the depth of the 3D surface is increased beneath the surface of the specimen.

Figure 13:
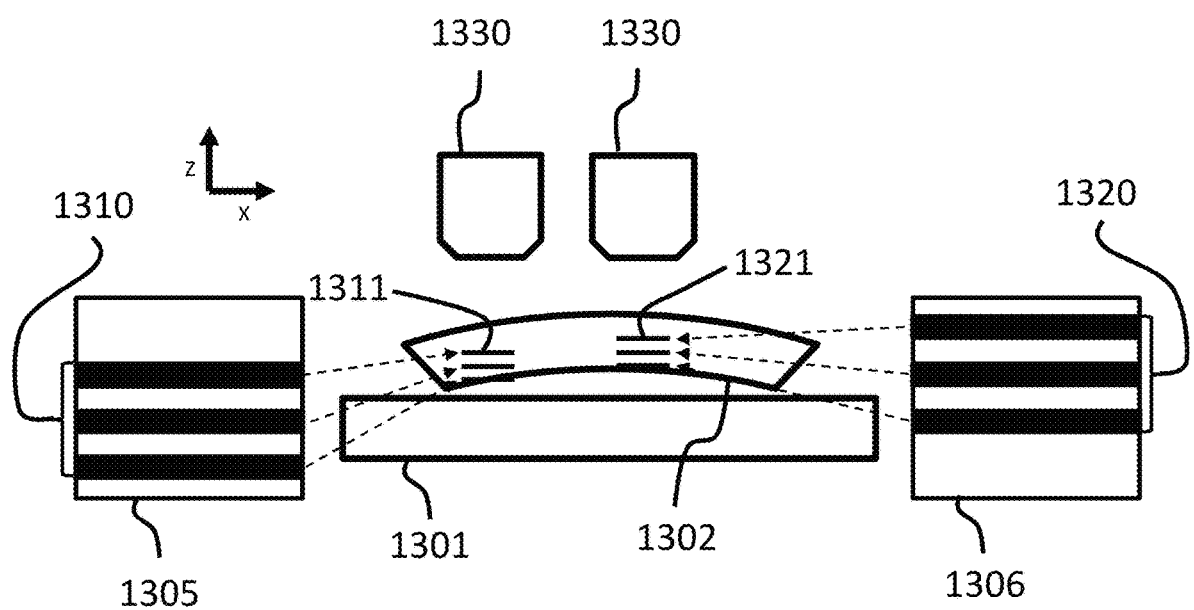
FIG. 13 is a schematic diagram showing how 3D scan strips can be moved in a vertical direction using motion of the active areas in the sensor without requiring focus change.

FIG. 13 shows a schematic illustration of how image strips are acquired by a sensor tilted in the scan direction (or a scan plane is tilted in the scan direction) when active areas selected in the sensor itself (or defined by software in the image frames as SDAA) can be used to move the flat image plane strips up and down with respect to the surface of the specimen, without making any mechanical focus change. In this diagram, the scan direction is the Y direction (into the diagram). Specimen 1302 is not flat, and is shown in this example curved upwards from both edges towards the center. On the left of the diagram, microscope objective 1330 is shown in a position that results in image frame 1305 being in a position to acquire images of three object plane strips 1311 using three active areas 1310 which are near the bottom of the frame, and MSIA. When the microscope acquires three scan strips of the specimen near the center of the specimen, which is higher the part of the specimen scanned near the edge, microscope objective 1330 is shown at the same position (no mechanical change in focus has occurred), resulting in image frame 1320 which because the active areas have been moved up, now images three object plane strips as the scan proceeds, that are above the position of image plane strips 1330. The focus plane of the scanner has been moved up because of motion of the active area in the sensor (or a change in position of the active area defined in software), without any change in the focus position of the microscope objective 1330.

Figure 14:
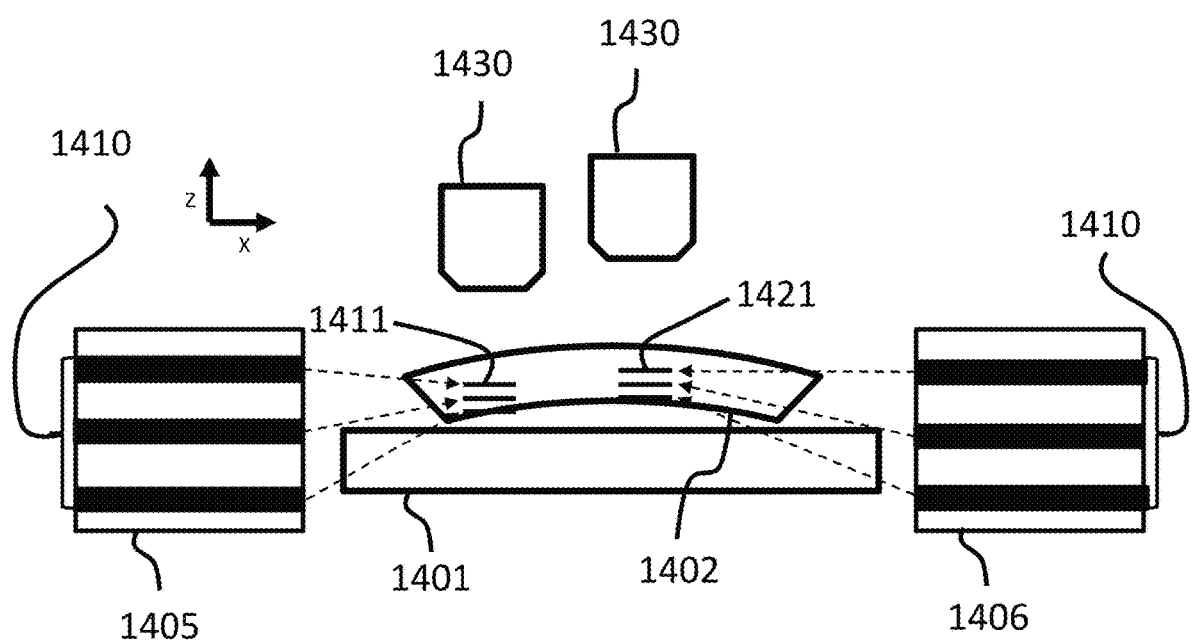
FIG. 14 is a schematic diagram showing how 3D scan strips can be moved in a vertical direction using a focus change.

FIG. 14 shows a schematic illustration of how image strips can be moved up and down relative to the specimen without changing the position of the active areas in the sensor, by changing focus of the microscope to follow the shape of the specimen (a so called "follow focus"), without changing the position of the active areas in the sensor array, or in the frame images acquired by the sensor array. In this illustration, microscope objective 1430 is focused on the specimen such that a series of frame images 1405 are acquired by the tilted image sensor (either the image sensor is tilted in the scan direction, or the scan plane is tilted with respect to the optical axis of the microscope) during scan. The scan direction is the Y direction, into the diagram. On the left of the diagram, microscope objective 1430 is shown in a position that results in image frame 1405 being in a position to acquire images of three object plane strips 1411 using three active areas 1410 which are equally spaced in the frame (in this example), and MSIA. Near the center of the specimen, where the specimen surface has moved upwards, microscope objective 1430 is shown after a mechanical change in focus has occurred, resulting in image frame 1320 which because the active areas have been moved up, now images three object plane strips as the scan proceeds, that are above the position of image plane strips 1330. The focus plane of the scanner has been moved up because of motion of the active area in the sensor (or a change in position of the active area defined in software), without any change in the focus position of the microscope objective 1330.

When the position of active areas is defined in software inside successive frame images, instead of choosing active areas inside the detector, the strip images can be tilted about the scan direction by tilting and changing the shape of the active areas as well as being moved up and down inside the specimen, so the edges of 3D surfaces from adjacent scan strips can be perfectly matched to produce a 3D set of surfaces that have the same shape as the surface of the specimen. If the reference surface changes more in the vertical direction than can be accommodated by the depth of field of the microscope optics and the range of motion of the active areas inside a frame image, a mechanical focus change can be performed and synchronized with scan data to register the proper position of active areas defined in earlier image frames with those in later frames.

Figure 15:
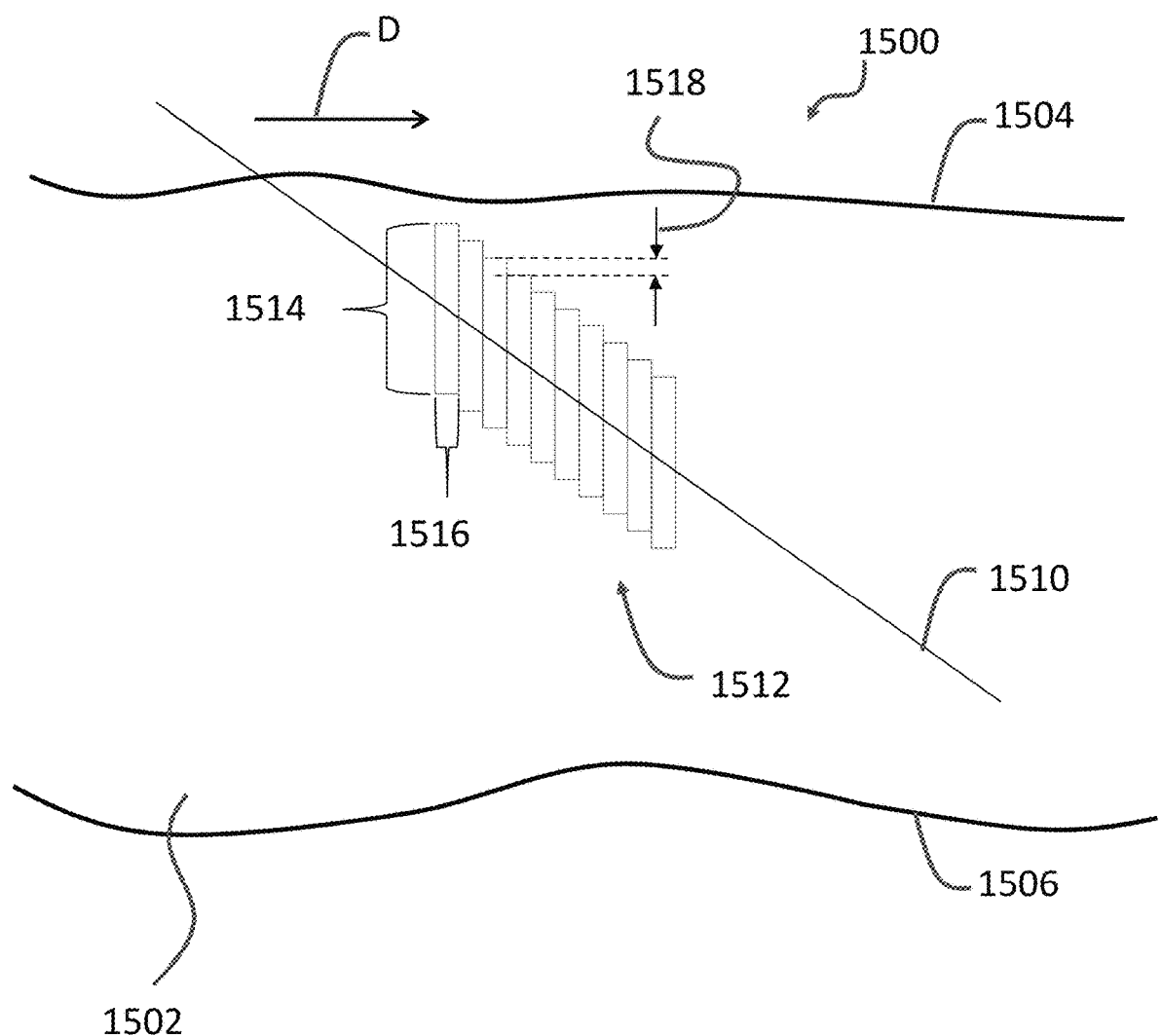
FIG. 15 is a schematic diagram showing a tilted object plane relative to a specimen and image data collected along the object plane.

Turning now to FIGS. 15-19, illustrated therein are various schematic diagrams showing a tilted object plane relative to a specimen, and how image data is collected along the object plane. In particular, FIG. 15 shows a diagram 1500 showing a specimen 1502, which may have an irregular top surface 1504 and/or bottom surface 1506. Also shown is an object plane 1510, which as shown is generally tilted at an angle with respect to a scan direction D (and in general the object plane 1510 is tilted relative to the specimen).

This diagram 1500 also shows ten volumes in the specimen indicated generally as 1512, each volume corresponding—via imaging optics—to a pixel location on the image sensor or detector. It will be understood that, although in this diagram the volumes 1512 are shown generally as being rectangular in shape, this is merely an schematic representation, and other shapes of the volumes are possible.

Each individual volume in the volumes 1512 generally has an optical depth of field 1514, which in this example may be about 1 µm in size. Each of the volumes 1512 generally has a pixel width 1516 in object space, which in this example may be about 0.25 µm in size. Adjacent volumes 1512 may be offset from each other by an offset distance 1518 in a direction perpendicular to the scan direction D (i.e., which may be in a vertical direction) so as to generally track along the tilt of the object plane 1516. In this example, the offset distance 1518 is about 0.004 µm in size.

Figure 16:
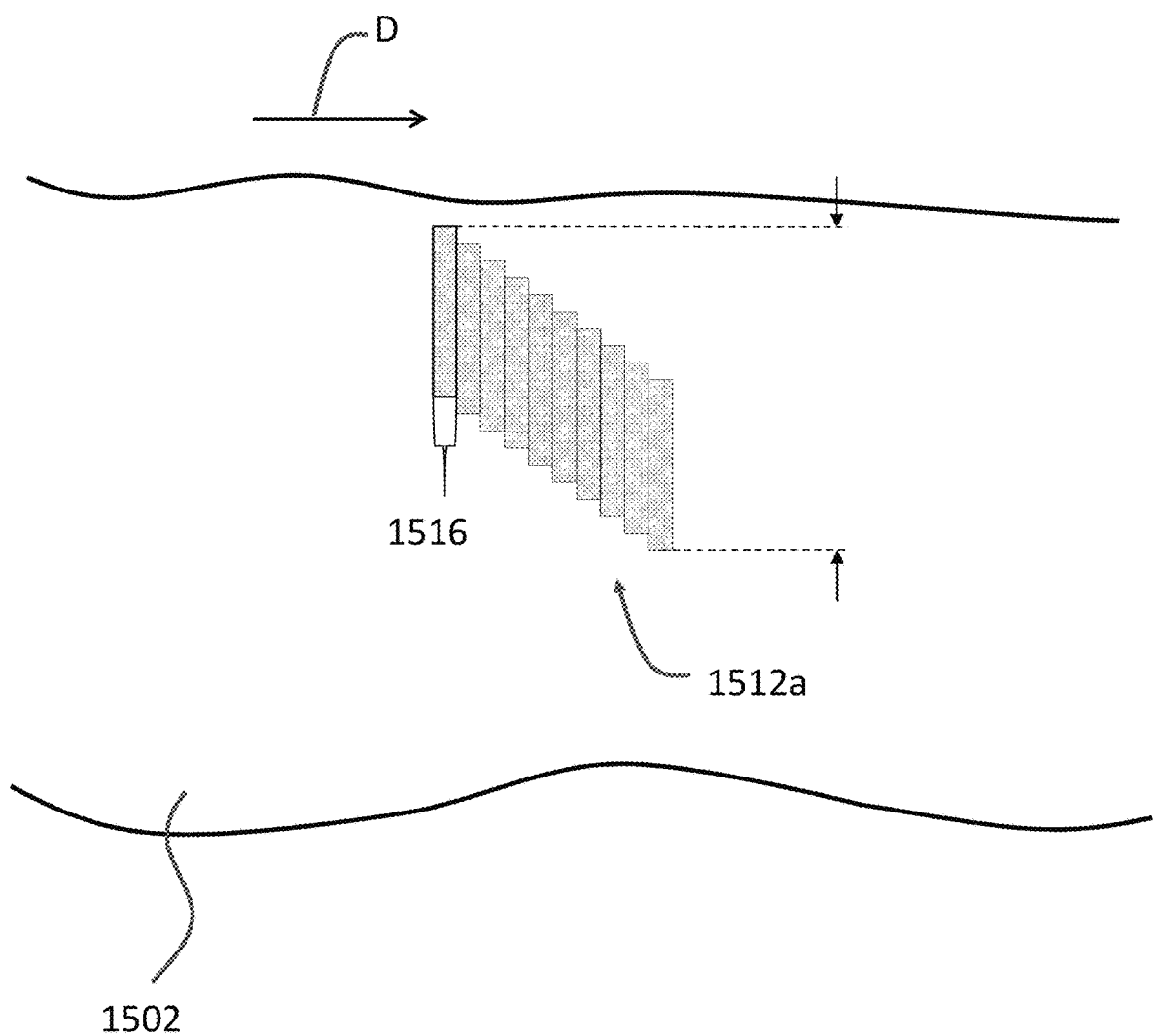
FIG. 16 is a schematic diagram of a first exposure of the image data of FIG. 15 collected at a first position.

Turning now to FIG. 16, this diagram shows a first exposure of the image data collected at a first position of the specimen 1502. In particular, this first exposure of shows a first ten volumes 1512a in the specimen 1502, each corresponding—via imaging optics—to a pixel location on the image sensor.

Figure 17:
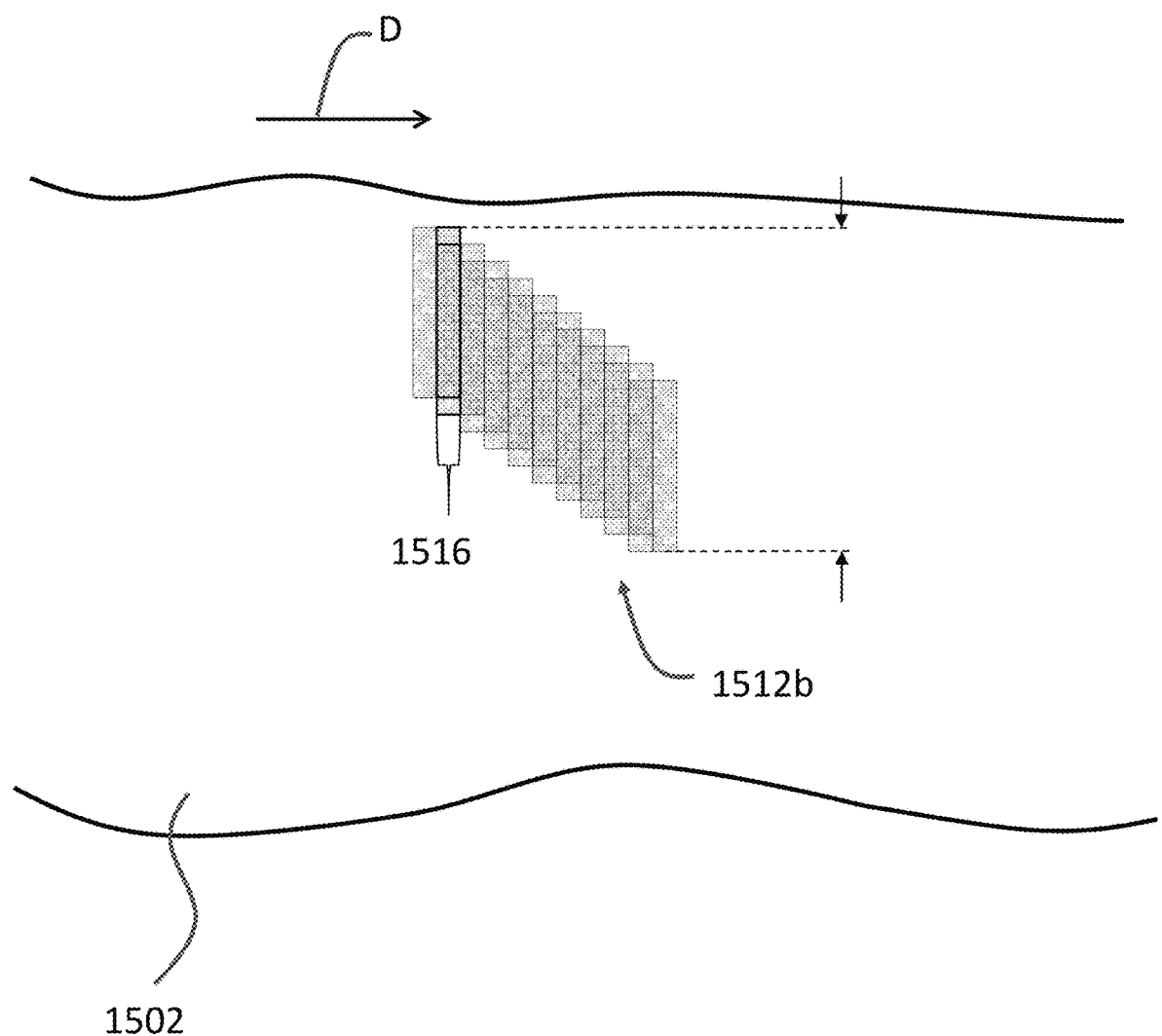
FIG. 17 is a schematic diagram of a second exposure of the image data of FIG. 15 collected at a second position.

Turning now to FIG. 17, this diagram shows a second exposure of the image data collected at a second position. In particular, the specimen 1502 has been moved in the scan direction D by a distance generally equal to the pixel width 1516, so that the second volumes 1512b overlap somewhat with the first volumes 1512a. In particular, this diagram shows two exposures of ten volumes in the specimen 1502, each corresponding—via imaging optics—to a pixel location on the image sensor.

Figure 18:
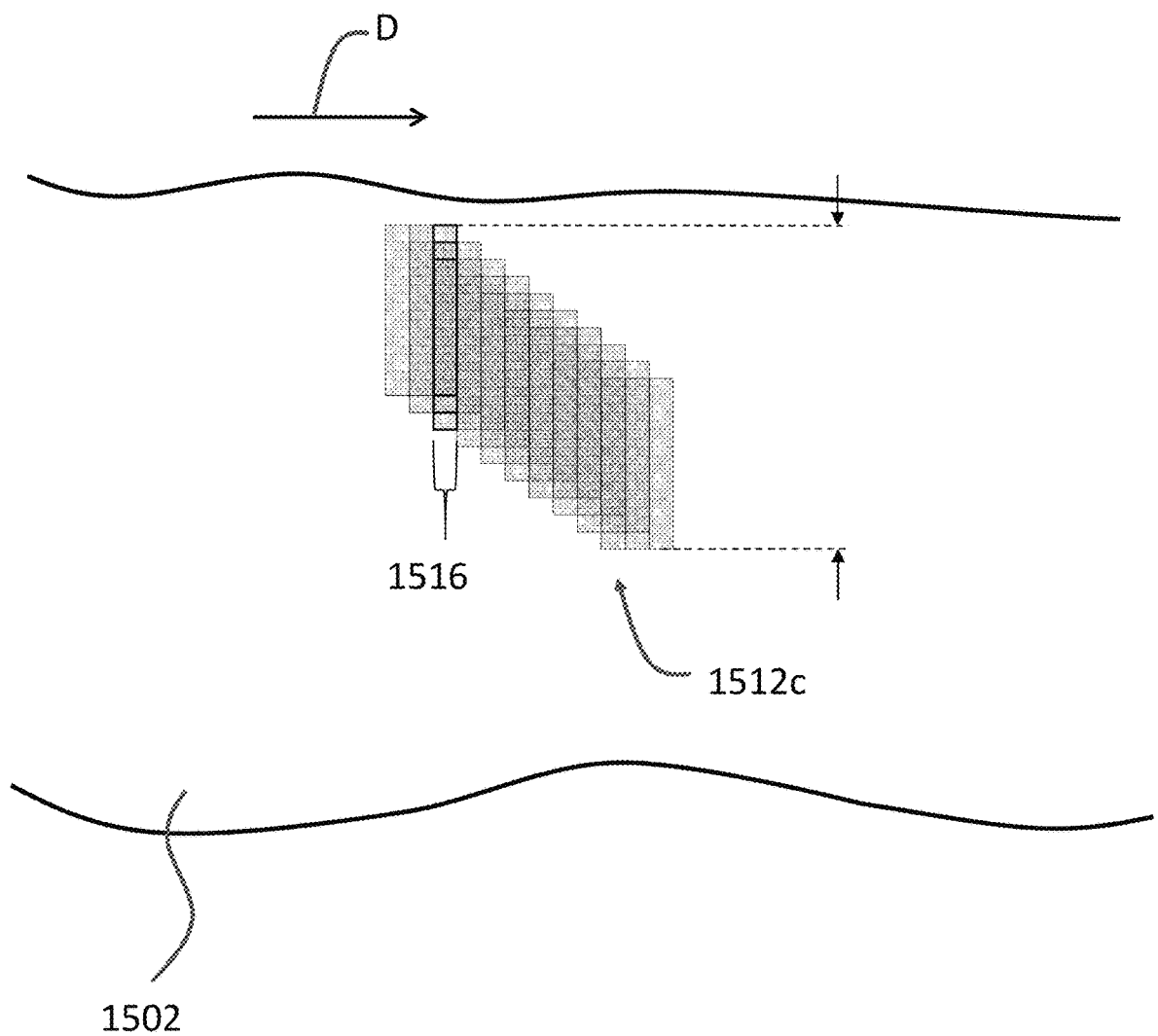
FIG. 18 is a schematic diagram of a third exposure of the image data of FIG. 15 collected at a third position.

Turning now to FIG. 18, this schematic diagram shows a third exposure of the image data collected at a third specimen position, with the third volumes 1512c overlapping somewhat with the first volumes 1512a and second volumes 1512b.

Figure 19:
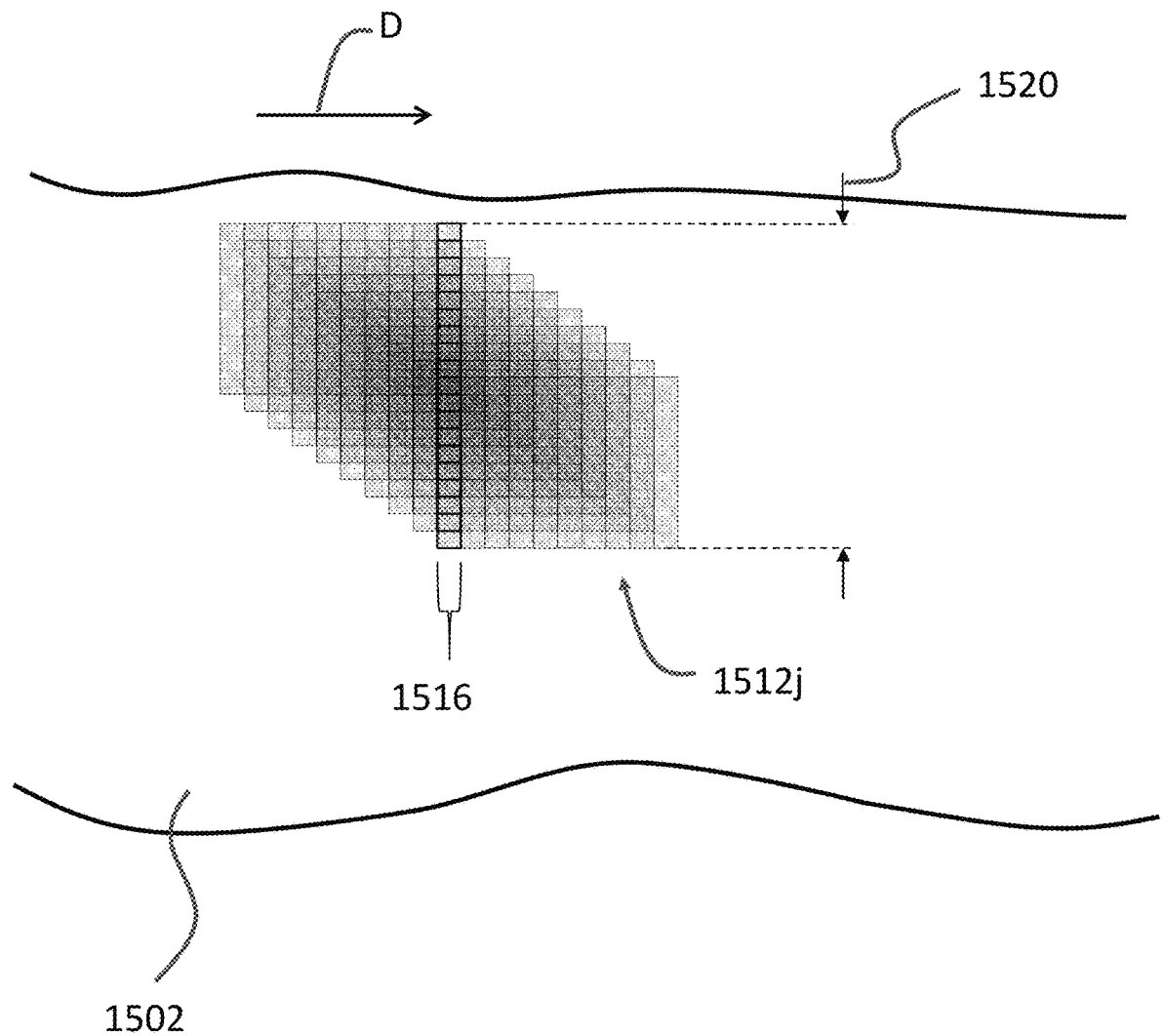
FIG. 19 is a schematic diagram of a tenth exposure of the image data of FIG. 15 collected at a tenth position.

Turning now to FIG. 19, this diagram shows a tenth exposure of the image data collected at a tenth position of the specimen 1502. The tenth volumes 1512j overlap somewhat with the other volumes from the previous nine positions (namely 1512a-1512i). Moreover, the total depth of field 1520 for each a single pixel is can be determined by averaging, which increases the optical depth of field 1514 from each of the previous ten exposures.

Figure 20:
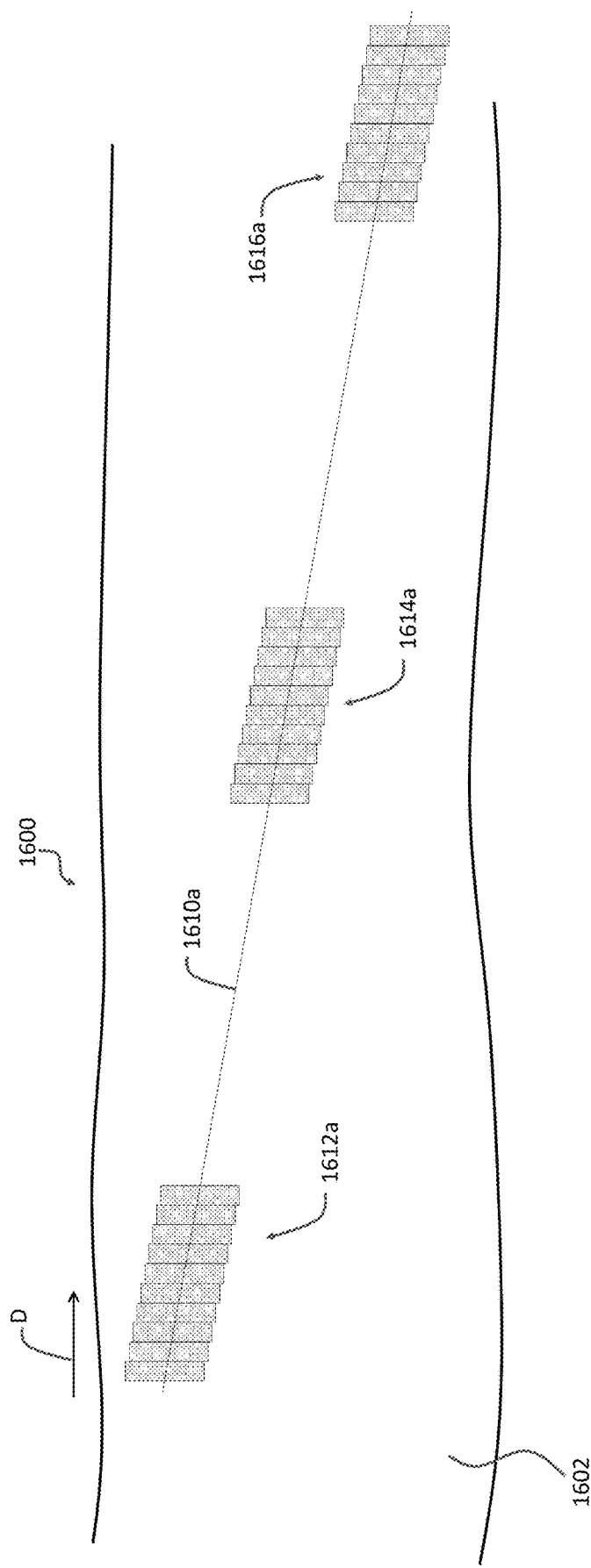
FIG. 20 is a schematic diagram of a first exposure of image data at a first position of three active areas of ten volumes each in a sample, each corresponding (via imaging optics) to a pixel location on an image sensor.

Turning now to FIG. 20, illustrated therein is a schematic diagram of a first exposure of image data taken at a first position. In particular, FIG. 20 shows a diagram 1600 with a specimen 1602, and an object plane 1610a shown in a first position, and which is tilted at an angle with respect to a scan direction D. This diagram 1500 also shows three active areas 1612a, 1614a, and 1616a each having ten volumes in the specimen 1602, with each volume corresponding—via imaging optics—to a pixel location on the image sensor or detector.

During a scan, as the specimen 1602 is moved relative to a detector (not shown) generally in the scan direction D, the object plane 1610a and active areas 1612a, 1614a, and 1616a will generally be moving in an opposite direction.

Figure 21:
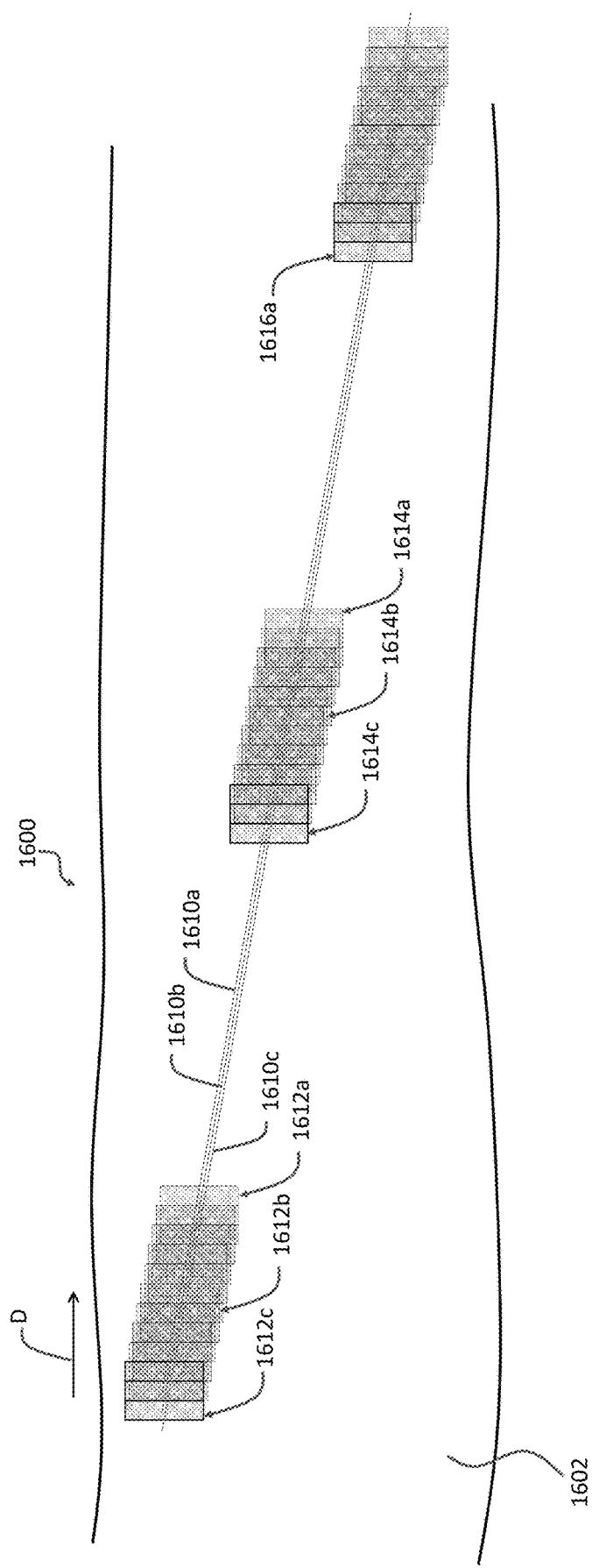
FIG. 21 is a schematic diagram of a third exposure of the image data of FIG. 20 at a third position.

For instance, FIG. 21 is a schematic diagram of the specimen 1602 at a third position, the object plane 1610a having moved through a second position 1610b and into a third position 1610c. Similarly, the active areas 1612a, 1614a, and 1616a have similarly moved through a second position 1612b, 1614b, and 1616c and into the third position 1612c, 1614c, and 1616c.

The invention claimed is:

1. An instrument for scanning a specimen on a specimen holder, comprising:
 a. a scanning stage for supporting the specimen, the scanning stage, the specimen and a scan plane in which the specimen moves relative to the optical axis each being tilted with respect to an object plane;
 b. a detector having at least one active area of pixels, the scanning stage and the detector movable relative to each other to move the specimen in a scan direction during a scan,
  wherein at least some of the at least one active area of pixels of the detector are operable to collect light from different depths inside the specimen during the scan and generate corresponding image data; and
  wherein, as the scanning stage moves the specimen in the scan direction, the detector is triggered to generate a series of image frames of the object plane that moves through the specimen; and
 c. a processor operable to perform Moving Specimen Image Averaging (MSIA) on the image data from each active area in the detector to generate a three-dimensional (3D) image of the specimen, the 3D image including a stack of two-dimensional (2D) image planes, the stack of 2D images planes comprising one 2D image plane for each active area in the detector.

2. The instrument of claim 1, wherein the pixels of the detector collect light across the object plane, and the scan direction is tilted relative to the object plane.

3. The instrument of claim 1, wherein each of the plurality of active areas of pixels comprise a plurality of adjacent rows of pixels.

4. The instrument of claim 1 further comprising an imaging objective that focuses light from the specimen onto the pixels of the detector.

5. The instrument of claim 4, wherein at least one of the detector, the scanning stage, and an imaging objective, are tilted so that the pixels collect light at different depths within the specimen.

6. The instrument of claim 1, wherein the detector is tilted with respect to a plane of the scanning stage about an axis that is parallel to the plane of the scanning stage and which is perpendicular to the scan direction.

7. The instrument of claim 1, wherein the detector is triggered to generate an image each time the specimen has moved a particular distance.

8. The instrument of claim 7 wherein the particular distance is equivalent to a distance between pixels in each plane of the 3D image.

9. The instrument of claim 7 wherein the particular distance is equivalent to an integer multiple of pixels in each plane of the 3D image.

10. The instrument of claim 1 wherein:
 a. the image data is stored in a memory; and
 b. the processor is operable to:
  i. perform MSIA on the image data from each active area of the detector to generate MSIA image data; and
  ii. assemble the MSIA image data into a stack of digital 3D image planes through a height of the specimen.

11. The instrument of claim 1, wherein light from an upper portion of the specimen will be collected on a first pixel in a first row of pixels of the detector, and light from a lower portion of the specimen will be collected on a second pixel in a second row of pixels of the detector.

12. The instrument of claim 1 further comprising a wedge sized, shaped and positioned so that the pixels of the detector are operable to collect light data from different depths inside the specimen.

13. The instrument of claim 1, wherein the instrument scans the specimen in one of brightfield and fluorescence.

14. The instrument of claim 1, wherein the specimen is illuminated from above by a light source.

15. A method of scanning a specimen on a specimen holder with an instrument, the instrument having a detector having at least one active area of pixels, the method comprising:
- a. tilting a scanning stage supporting the specimen and the specimen holder with respect to an object plane that is perpendicular to an optical axis of the instrument;
- b. moving the specimen and the detector relative to each other in a scan direction during a scan, the specimen moving along a scan plane that is tilted relative to the object plane, wherein at least some of the at least one active area of pixels of the detector are operable to collect light from different depths inside the specimen during the scan and generate corresponding image data; and
- c. performing Moving Specimen Image Averaging (MSIA) on the image data from each active area of the detector to generate a three-dimensional (3D) image of the specimen, the 3D image including a stack of two-dimensional (2D) image planes, the stack of 2D images planes comprising one 2D image plane for each active area in the detector.

* * * * *